(12) United States Patent
Thirion de Briel et al.

(10) Patent No.: US 6,176,360 B1
(45) Date of Patent: *Jan. 23, 2001

(54) FRICTION CLUTCH WITH WEAR ADJUSTING DEVICE, IN PARTICULAR FOR MOTOR VEHICLES

(75) Inventors: Jacques Thirion de Briel, Colombes; Michel Blard, Issy-les-Moulineaux; Olivier Doremus, Izel lez Hameau, all of (FR)

(73) Assignee: Valeo (FR)

( * ) Notice: Under 35 U.S.C. 154(b), the term of this patent shall be extended for 0 days.

This patent is subject to a terminal disclaimer.

(21) Appl. No.: 09/068,463

(22) PCT Filed: Sep. 17, 1997

(86) PCT No.: PCT/FR97/06143

§ 371 Date: May 6, 1999

§ 102(e) Date: May 6, 1998

(87) PCT Pub. No.: WO98/12444

PCT Pub. Date: Mar. 26, 1998

(30) Foreign Application Priority Data

Sep. 17, 1996 (FR) .................................................. 96 11297
Dec. 23, 1996 (FR) .................................................. 96 15865

(51) Int. Cl.⁷ .................................................. F16D 13/75
(52) U.S. Cl. .................................... 192/70.25; 192/111 A
(58) Field of Search ............................. 192/70.25, 111 A

(56) References Cited

U.S. PATENT DOCUMENTS

| | | | | |
|---|---|---|---|---|
| 4,194,610 | * | 3/1980 | Miller | 192/111 A |
| 5,090,536 | * | 2/1992 | Asada | 192/70.25 |
| 5,251,737 | * | 10/1993 | Flotow et al. | 192/111 A |
| 5,816,379 | * | 10/1998 | De Briel et al. | 192/70.25 |
| 5,845,750 | * | 12/1998 | De Briel et al. | 192/70.25 |
| 5,937,986 | * | 8/1999 | Schubert | 192/70.25 |
| 5,944,157 | * | 8/1999 | Blard et al. | 192/70.25 X |
| 5,971,125 | * | 10/1999 | Doremus et al. | 192/70.25 |

FOREIGN PATENT DOCUMENTS

| | | | |
|---|---|---|---|
| 2424442 | * | 11/1979 | (FR) . |
| 2739159 | * | 3/1997 | (FR) . |
| 2286022 | * | 8/1995 | (GB) . |

* cited by examiner

*Primary Examiner*—Rodney H. Bonck
(74) *Attorney, Agent, or Firm*—Liniak, Bernato Longarce & White

(57) ABSTRACT

The friction clutch comprises a friction disc, a pressure plate (1), a cover plate (2), a diaphragm (3) working between, firstly, the cover plate (2) and secondly the pressure plate (1), the said clutch also including a wear compensating device comprising ramps (11) disposed circumferentially and adapted so as to be driven in rotation by means of a set of teeth (18) which they carry at their periphery and with which a tangentially disposed worm (13) cooperates, a ratchet wheel (20) for driving the worm (13) in rotation being provided and rendered operational by wear in the friction liners when the clutch is engaged, together with non-return catches (36) for preventing the worm (13) from turning in the direction opposite to that in which it is driven in rotation by the ratchet wheel when it is operational, the worm (13), the non-return catches (36) and the ratchet wheel (20) being carried by a support (12) fixed to the cover plate (2): the ratchet wheel (20) of the worm (13) is controlled by the diaphragm (3).

25 Claims, 11 Drawing Sheets

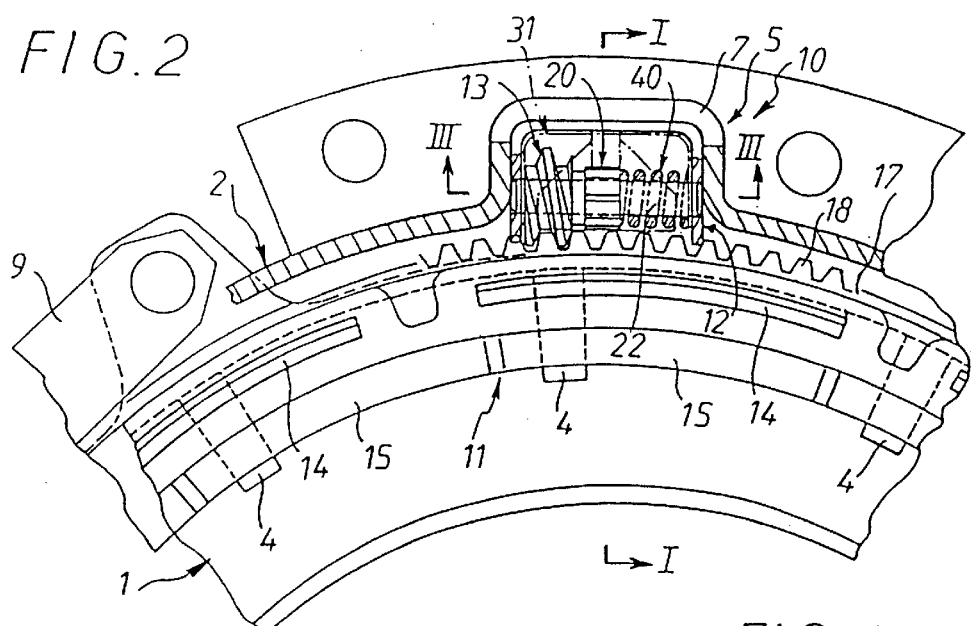

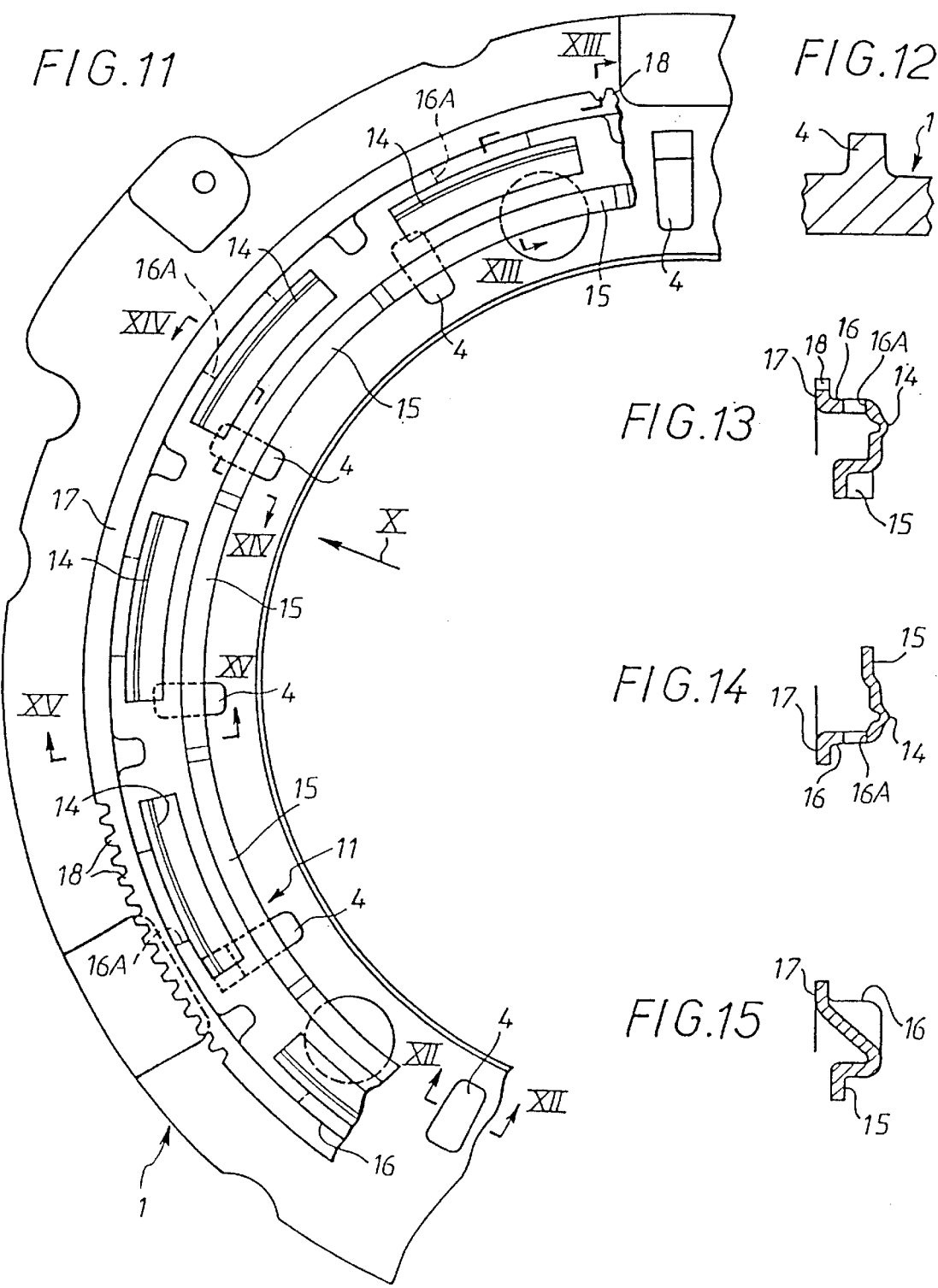

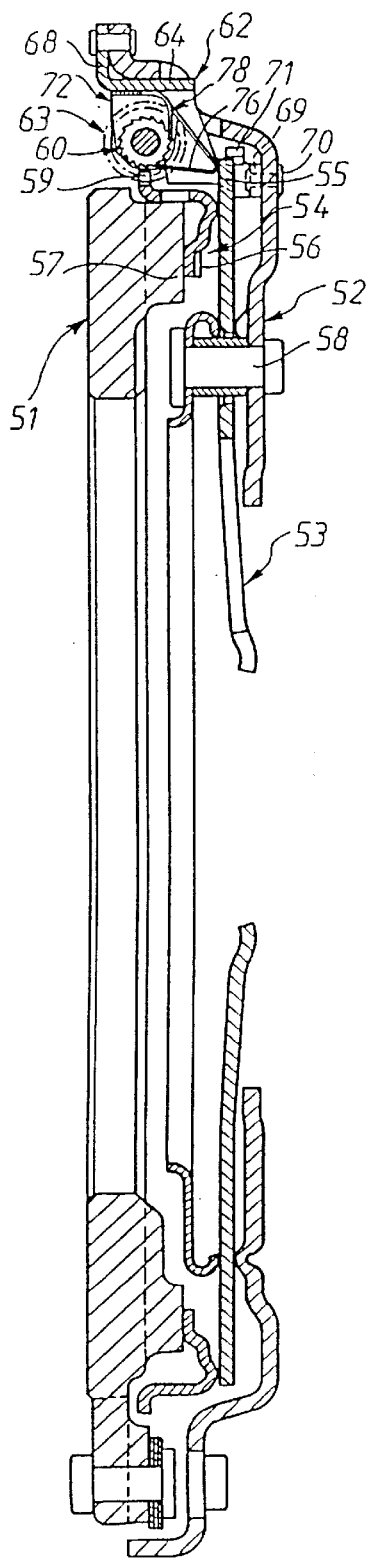

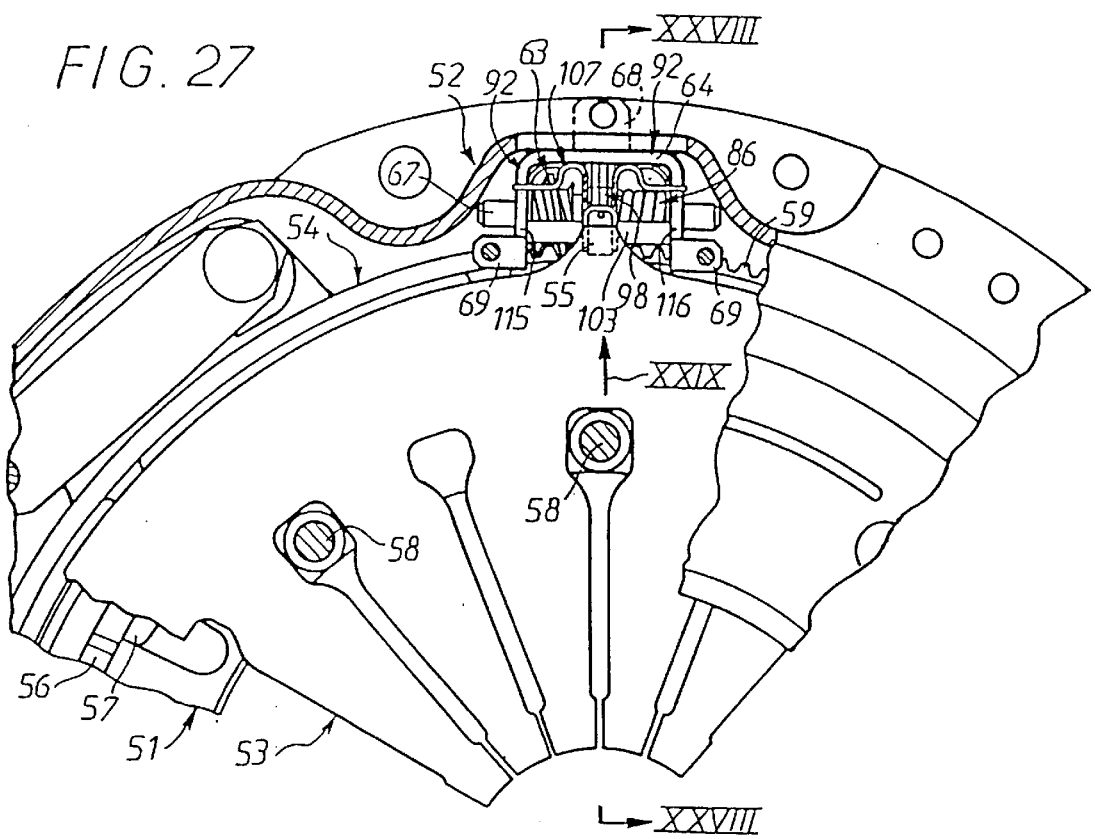
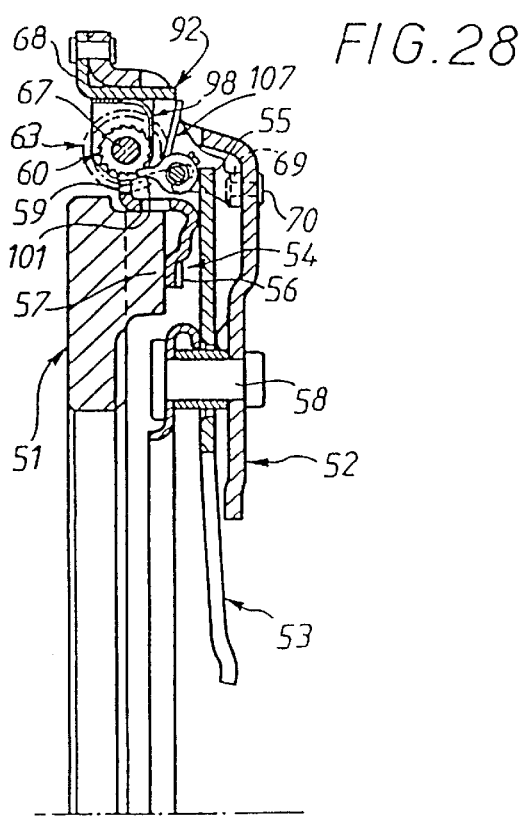
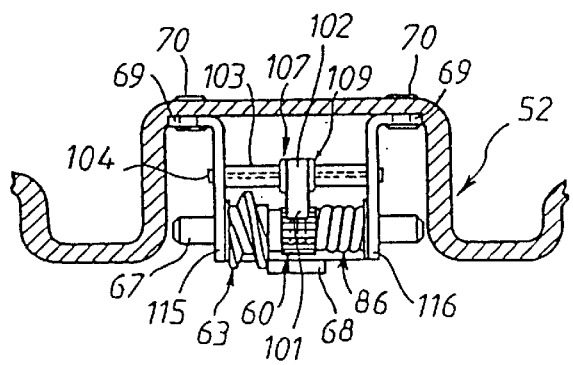

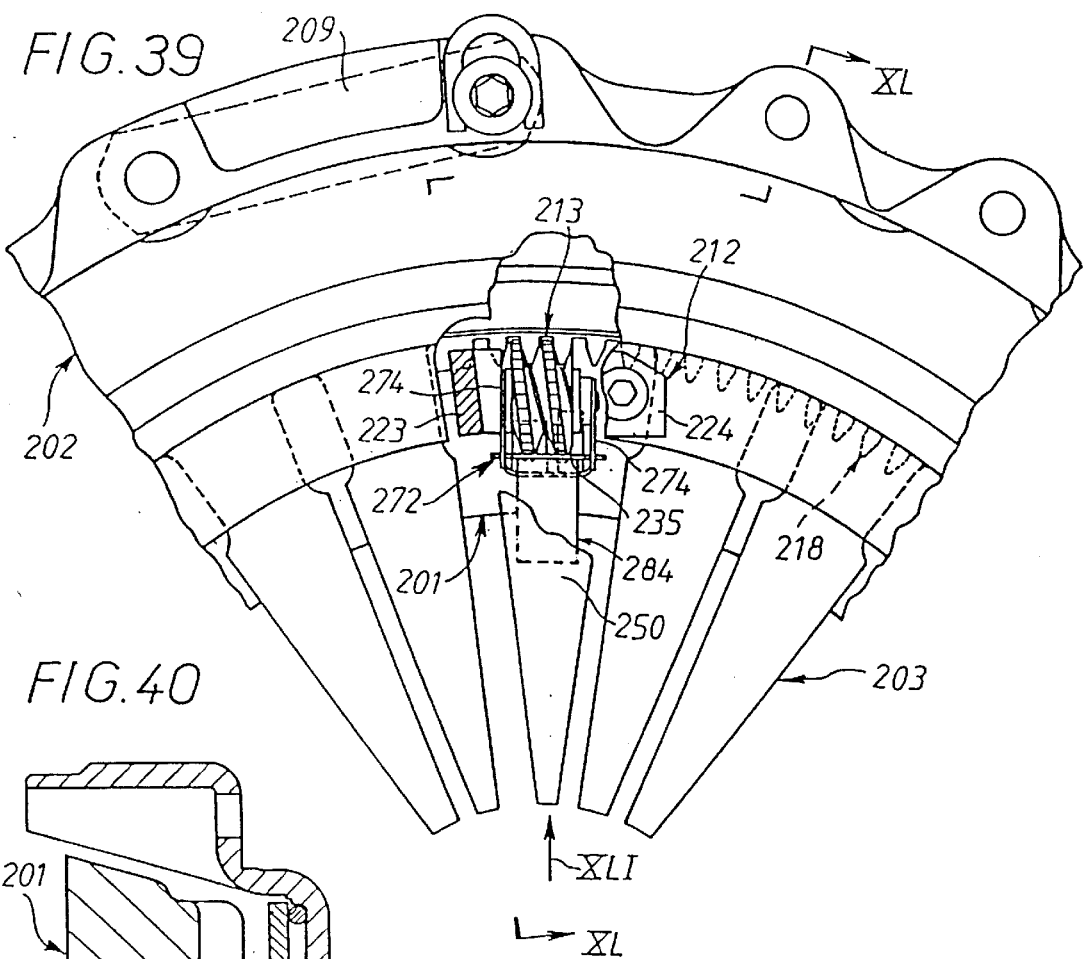
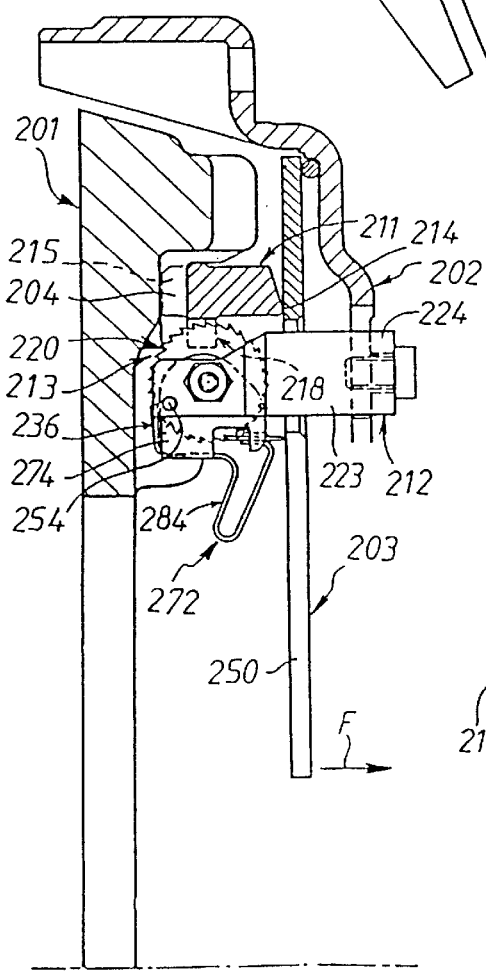
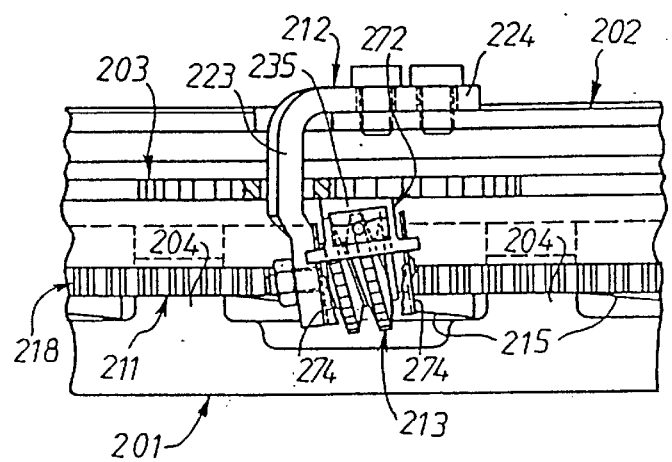
FIG. 39
FIG. 40
FIG. 41

FRICTION CLUTCH WITH WEAR ADJUSTING DEVICE, IN PARTICULAR FOR MOTOR VEHICLES

The present invention relates to a friction clutch, in particular for a motor vehicle, and more particularly it relates to a clutch equipped with a device for compensating for wear, due in particular to wear in the friction liners, the said device, referred to hereinafter as a wear compensating device, operating as the said liners become worn.

A conventional friction clutch generally includes a reaction plate, which may be in two parts so as to constitute a torsion damper, and which is mounted in rotation on a first shaft, which is typically a driving shaft such as the crankshaft of the internal combustion engine and which supports, through its outer periphery, a cover plate to which at least one pressure plate is attached.

The pressure plate is coupled in rotation to the cover plate and to the reaction plate, while being able to be displaced axially under the action of controlled axially acting resilient means, consisting generally of a metallic diaphragm which bears on the cover plate, while a friction disc, carrying friction liners at its outer periphery and fixed in rotation to a shaft, typically a driven shaft such as the input shaft of the gearbox, is interposed between the pressure plate and the reaction plate in such a way as to be gripped between them when the clutch is in an engaged condition. The diaphragm controls the axial displacement of the pressure plate when it is actuated by a clutch release bearing. More precisely, the peripheral portion of the diaphragm constitutes the above mentioned resilient means, or clutch engaging means, controlled by the declutching means, which in the present case are the fingers of the diaphragm. The clutch engaging means, when they are actuated by the clutch release bearing, counteract the action of the declutching means.

In the course of the useful life of such a clutch, the friction liners become worn along with the counter materials, i.e. the pressure plate and reaction plate, and this causes variation to take place in the position of the pressure plate and those of the axially acting resilient means and the clutch release bearing, from which there follows a variation in the gripping force exerted between the friction disc on the one hand and the pressure and reaction plates on the other hand, because of the changes that take place in the working conditions (or positions) of the diaphragm, and the force necessary to disengage the clutch is consequently affected. By equipping such a clutch with a wear compensating device, these drawbacks are avoided, the diaphragm and the clutch release bearing, which is typically in constant engagement on the diaphragm, occupying the same position when the clutch is in its engaged condition.

It has already been proposed, in the document U.S. Pat. No. 5,090,536, to provide a take-up device by arranging between the diaphragm and the pressure plate two annular sleeves carrying complementary ramps, a first annular sleeve being fixed in rotation with respect to the pressure plate, the second one being displaceable in rotation with respect to the latter and to the first sleeve, with the relative circumferential displacement of the two sleeves leading, due to the complementary ramps which they carry, to the sleeves moving apart in the axial direction so as to compensate for the said wear, this movement apart of the sleeves simulating an increase in the axial thickness of the pressure plate; for its relative displacement in rotation, the second sleeve is provided at its periphery with a toothed sector, the teeth of which mesh with a worm which is disposed tangentially and which is mounted in rotation on a shaft carried by the cover plate of the clutch; the worm is arranged to be driven in rotation by means of a uni-directional coupling, through a drum carried by the same shaft that carries the worm, which drum is itself driven in rotation when wear occurs in the liners of the friction disc; the uni-directional coupling is so arranged that the worm is driven by the drum, which constitutes a kind of arming member for the device when the latter is itself driven in rotation during the declutching operation, the rotation of the worm leading to rotation of the second sleeve as stated above.

A uni-directional coupling disposed between the worm and the shaft that supports it enables the latter to keep its rotational position after each adjustment.

Such a device, in accordance with the document U.S. Pat. No. 5,090,536, has the following disadvantages: the arming member which is carried by the cover plate of the clutch, is liable to become driven in rotation by a lever which is itself controlled by the clutch release bearing; beyond that, the clutch release bearing must be specifically adapted for control of the said lever, and is bulky in the axial direction; in addition, when the clutch release bearing is caused to be displaced axially beyond the course of travel that is just necessary for the declutching operation, the take-up operation is effected when no wear has taken place, which is dangerous because it can lead to jamming of the clutch, which ends up by being no longer able to be disengaged.

An object of the present invention is to overcome these disadvantages.

According to the invention, a friction clutch, especially for a motor vehicle, of the kind comprising a reaction plate adapted to be mounted in rotation on a driving shaft, a friction disc carrying friction liners at its outer periphery and adapted to be mounted in rotation on a driven shaft, a pressure plate, a cover plate fixed on the reaction plate, axially acting resilient means acting between, firstly, the cover plate, and secondly, the pressure plate through abutment means, the pressure plate being fixed in rotation to the cover plate while being able to be displaced axially with respect thereto and being subjected to the action of resilient return means for returning the pressure plate axially towards the cover plate, the said clutch further including a wear compensating device comprising circumferentially disposed ramp means located axially between the abutment means and the pressure plate and adapted to be driven in rotation by means of a set of teeth, which they carry at their periphery and with which a tangentially disposed worm cooperates, means for driving the worm in rotation being provided and being rendered operational by wear in the friction liners when the clutch is engaged, together with non-return means preventing the worm from turning in the direction counter to that in which it is driven in rotation by the means for driving it in rotation when they are operational, the worm, the non-return means and the means for driving the worm in rotation being carried by a support fixed to the cover plate, and the axially acting resilient means consisting of a diaphragm, is characterised by the fact that the means for driving the worm in rotation are controlled by the diaphragm.

The fact that the worm, the non-return means and the means for driving the worm in rotation are carried by the cover plate improves the precision with which wear is detected.

Preferably, the means for driving the worm in rotation are controlled by the diaphragm through an interposed tongue or control finger, constituting a control member, the course of travel of which is limited during operation of the clutch by a so-called control abutment.

Preferably, the ramp means consist of an annular ring having ramps which are inclined and spaced apart circumferentially; preferably, the pressure plate has pads or ramps which are arranged to cooperate with the ramps of the ramp means.

Preferably, the said annular ring further includes engagement zones consisting of the rounded upper edge of press-formed projecting elements disposed on circular arcs centred on the axis of the clutch and located radially outwardly of the ramps; thanks to this arrangement, firstly, the engagement zones are very long, and secondly, numerous ramps can be provided so that the contact pressures are minimised.

Preferably, the ramp means have an axial flange provided with ventilating apertures; preferably, the ramp means have an axial flange which centres the ramp means with respect to the pressure plate.

Preferably, the worm is mounted for sliding movement along its axis, being subjected to the action of a resilient so-called take-up means, and when it is displaced along its axis, it drives the said ramp means in circumferential rotation; preferably, the load exerted by the resilient take-up means increases with wear in the friction liners, and the said axial displacement is obtained by action of the resilient take-up means when its load is high enough to overcome the friction force due to the axial force from the resilient return means to which the ramp means are subjected, the clutch being disengaged; in another version, the course of travel of the pressure plate is limited in the declutching direction so as to release the ramp means from the axial force arising from the resilient return means.

Preferably, the resilient take-up means is a helical spring surrounding a shaft which carries the worm; the means for driving the worm in rotation consist of a ratchet wheel which is fixed to the worm for rotation with the latter.

Preferably, the shaft carrying the worm and the helical spring is supported by the support.

Preferably, the non-return means consist of a catch which cooperates with the ratchet wheel.

The clutch may be of the push-to-release type, with the diaphragm being fixed to the cover plate by means of short posts; it may equally be of the pull-to-release type.

The support is U-shaped, having a spine portion and two wing portions adapted to support the shaft; the wing portions of the support piece are extended by L-shaped arms, which extend towards each other at right angles to the spine portion, and each of which terminates in a C-shaped end seamed on the edge of a transverse aperture of the cover plate; this aperture is formed in a radial projecting element that defines a housing for the device for taking up clearance.

The support is adapted to receive a resilient member in the general form of a crook, each end of which is provided with an inwardly directed return portion; the portion of the crook having the greater length increases in width towards its end, to terminate in a return portion, the end of which carries a control tongue; the portion of the crook having the shorter length has a return portion that constitutes a non-return catch which extends generally parallel to the control tongue and which is spaced away from the latter, in such a way that, when the resilient member and the ratchet wheel are mounted in the support piece, the non-return catch and the control tongue each cooperate with the root of a tooth; for mounting it in the support piece, the resilient member carries lateral stirrup arms disposed on either side of the resilient crook-shaped portion and extending orthogonally with respect to the latter, and the free ends of the stirrup arms carry holes for the shaft.

Preferably, the worm and the ratchet wheel are formed in the same component, which is simple and inexpensive to make.

The support piece, equipped with the worm, the ratchet wheel, the resilient member, the spring and the shaft, constitutes a sub-assembly ready to be installed in the cover plate.

The diaphragm carries at its periphery a radial finger referred to as an actuator, which extends radially outwardly from the Belleville ring portion of the diaphragm, so as to cooperate with the widened zone of the long part of the resilient member.

The teeth of the ratchet wheel are made in such a way that, during the course of declutching with new friction liners, the end of the control tongue does not jump a tooth, and the non-return catch preferably holds the ratchet wheel in place.

The teeth of the ratchet wheel are made in such a way that, during a minimum course of travel in the declutching operation, defined by construction, and ignoring the controlling release bearing, the end of the control tongue does jump one tooth.

The portion of the crook of the resilient member having the greater length comes into abutment against the arms of the support piece.

If sufficient wear has taken place for the ratchet wheel to have rotated by an amount great enough for the control tongue to have jumped a tooth on the return movement, the control tongue, pushed by the actuator, causes the ratchet wheel and ramp means to rotate during the operation of engaging the clutch.

Preferably, the support piece is U-shaped, having a spine portion and two wing portions, each carrying a hole adapted to receive the shaft of the device, the spine portion carrying a lateral stirrup lug directed outwardly and adapted to be fixed on the external flange of the cover plate; the wing portions of the support piece have, on the opposite side from that on which the lug is situated, an axial extension, the end of which is bent outwardly so as to constitute a fastening lug parallel with the said lug and adapted to be fixed to the base of the cover plate; on their portion which is directed towards the spine portion, the said extensions are provided with return elements which extend towards each other, generally parallel to the spine portion and adapted to constitute abutments; the mutually facing ends of the said return elements are spaced apart from each other by a distance sufficient to enable the actuator to be displaced without damage to it during the operations of engaging and disengaging the clutch.

The resilient member is in the form of a saddle and comprises a flat elongate body carried at each of its ends an arm having a hole adapted to receive the shaft; on one of its longitudinal edges, the body is extended to define an oblique extension on the same side as that on which the arms are located; slots formed in the body limit the extension with respect to the ends of the body carrying the arms; the free end of the extension is provided with a return element which is extended by a control tongue extending towards the body and generally parallel to the latter; an aperture is formed in the extension; a non-return catch is defined by this aperture and by slots in the body, and consists of at least two flat fingers of slightly different lengths.

In another version, the resilient member comprises two distinct members; a first member, for the non-return function, is a U-shaped stirrup member, the two wing portions of which carry holes for supporting the shaft; the spine portion of the said stirrup member is, on one of its sides and in the vicinity of its middle part, divided into at least two strips, which extend in a direction parallel to that of the wing portions and are extended by return portions at right angles, which extend on the same side as the wing portions with respect to the spine portion, generally at right angles to the said spine portion; the said return portions are of slightly different lengths, and the strips constitute a non-return catch which is adapted to cooperate with the ratchet wheel.

Preferably, the second member for the control function of the ratchet wheel is a wire spring associated with a finger carried by a cylindrical sleeve force-fitted on a shaft; the sleeve and its finger are fixed to the shaft for rotation with the latter, by a cotter pin which passes diametrically through the sleeve and the shaft, and which projects from one side of the sleeve so as to constitute an end stop for the base portion of an open loop of the wire spring, which is configured in the manner of a coathook, the said wire spring being adapted to subject the control finger to a torque which applies the end of the finger on the ratchet wheel.

Preferably, the support comprises wing elements which are provided, on their edge opposite to the spine portion, with open slots beside the holes for the shaft, these slots making a slight angle with the plane of the spine portion and having a width which is adapted to receive the shaft of the control finger.

Preferably, the pressure plate has, towards its outer periphery, a rebate facing the cover plate and enabling the wear compensating device to be accommodated.

Preferably, the control finger is directly actuated by the outer periphery of the diaphragm.

Preferably, the teeth of the ratchet wheel are formed at the outer periphery of the thread of the worm. This arrangement is inexpensive and simple; the component is lighter and less complex; the ratchet wheel can thus have more teeth; axial size is reduced; machining is easier and reliability improved.

Preferably, the support piece is generally L-shaped, having two wing portions, one of which is adapted to support the shaft, the other one being adapted for fastening the support piece on the cover plate; the wing portion that supports the shaft extends through the diaphragm between two of its fingers.

Preferably, the resilient member has the general form of a saddle and comprises a flat body carrying at each of its ends an arm having a hole adapted to receive the shaft; the two arms are parallel and extend on the same side and generally at right angles with respect to the body; on one of its longitudinal edges, the body is extended in an extension which has a first portion that extends the body lengthwise, a second portion directed in the opposite direction from the arms and making an acute angle with the body, a third portion defining a U with the second portion and extending parallel to the latter, and a fourth portion directed towards the body and being parallel to the latter, at a slightly higher level such that it extends between the arms; the said fourth portion constitutes a control tongue directly or otherwise; a slot formed in each of the arms limits the course of travel of the control tongue, parallel to the body, at least away from the body; on its longitudinal edge opposite to that on which the extension is situated, the body carries a non-return catch consisting of at least two flat fingers of different lengths, the difference between these lengths being of the order of one half tooth.

Preferably, the resilient take-up means is a spring wound around the shaft, being located in a housing formed in the interior of the ratchet wheel or worm; in another version, the resilient take-up means is on the outside of the worm, and is made in the form of an elastic stirrup straddling the said worm.

Preferably, the support consists of at least one resilient leaf, which is connected on one side to the shaft around which the worm is mounted for rotation, and on the other side to the cover plate.

Preferably, the shaft is inclined with respect to a plane at right angles to the axis of the clutch, by an angle equal to that of the thread of the worm.

In a further version, the clutch includes several wear compensating devices, for example three, which are spaced apart circumferentially at equal intervals.

For a better understanding of the subject matter of the invention, some embodiments, shown in the attached drawings, will now be described by way of purely illustrative and non-limiting example.

FIG. 2 is a partial view of the clutch, in cross section taken on the line II—II in FIG. 1 and partly cut away;

FIG. 3 is a partial view in cross section taken on the line III—III in FIG. 2;

FIG. 4 is a perspective view of the compensating device without its support piece;

FIG. 5 is a perspective view showing the resilient member;

FIGS. 6 to 8 show the support piece of the compensating device; FIG. 6 is a plan view, FIG. 7 is a view in cross section taken on VII—VII in FIG. 6, and FIG. 8 is a view in cross section taken on VIII—VIII in FIG. 6;

FIG. 9 is a plan view showing part of the finger for actuating the diaphragm;

FIG. 10 is a side view in the direction of the arrow X in FIG. 11, showing the ramp means;

FIG. 11 is a plan view, partly cut away, of the clutch without its diaphragm;

FIG. 12 is a a view in cross section taken on XII—XII in FIG. 11;

FIG. 13 is a view in cross section taken on XIII—XIII in FIG. 11;

FIG. 14 is a view in cross section taken on XIV—XIV in FIG. 11;

FIG. 15 is a view in cross section taken on XV—XV in FIG. 11;

in FIG. 16 the clutch is disengaged with new liners; in FIG. 17 the clutch is engaged with worn liners; in FIG. 18 the clutch is disengaged with worn liners, and in FIG. 19, the clutch is engaged, with wear taken up;

FIG. 21 is a view in cross section taken on XXI—XXI in FIG. 20;

FIG. 22 is a perspective view showing the arrangement of FIGS. 20 and 21 without its support piece;

FIG. 23 is a perspective view of the support piece;

FIG. 24 is a perspective view of the resilient member;

FIG. 25 is a side view in the direction of the arrow XXV in FIG. 20;

FIG. 26 is a plan view showing part of the finger for actuating the diaphragm;

FIG. 27 is a plan view showing part of a clutch equipped with another version of the wear compensating device in accordance with the invention;

FIG. 28 is a partial view in cross section taken on XXVIII—XXVIII in FIG. 27;

FIG. 29 is a partial side view in the direction of the arrow XXIX in FIG. 27;

FIG. 39 is a plan view showing part of a clutch equipped with yet another version of the wear compensating device in accordance with the invention;

FIG. 40 is a partial view in cross section taken on XLX—XLX in FIG. 39;

FIG. 41 is a partial side view in the direction of the arrow XLI in FIG. 39;

Figure 46:
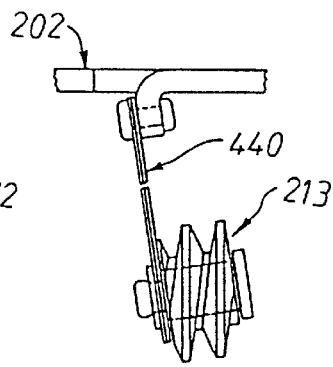
Figure 47:
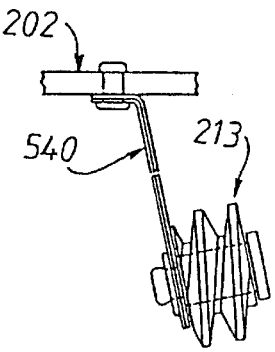
Figure 45:
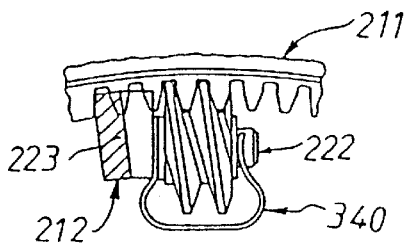
Figure 48:
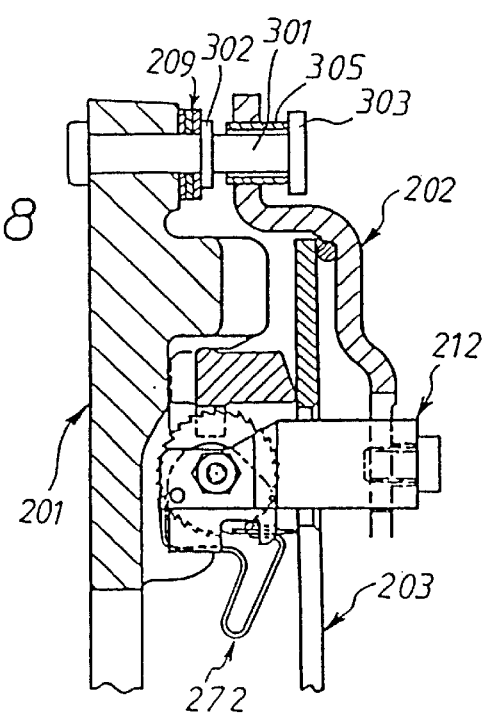

each of FIGS. 45 to 47 shows, respectively, a further version of the actuating spring;

FIG. 48 is similar to FIG. 40 and shows another version.

In the drawings, the diaphragm clutch 3, 53, 203 includes a hollow cover plate 2, 52, 202.

In this case the cover plate is of metal and is press-formed from plate.

The cover plate includes a base and means for fastening it to a reaction plate, which may be of divided form so as to constitute a damped flywheel.

In the embodiments of FIGS. 1 to 26, the cover plate 2, 52 is in the general form of a hollow dish, and includes at its outer periphery a radial flange which constitutes means for fastening the cover plate to the reaction plate, the said flange being formed with holes for passage through them of fastening members such as screws, for fastening the cover plate to the reaction plate.

In the embodiments of FIGS. 39 to 48, the fastening means of the cover plate consist of an axially orientated annular skirt which extends a radial flange formed with holes for passage through them of fastening members, such as screws, for fastening the cover plate 202 to the reaction plate.

Figure 35:
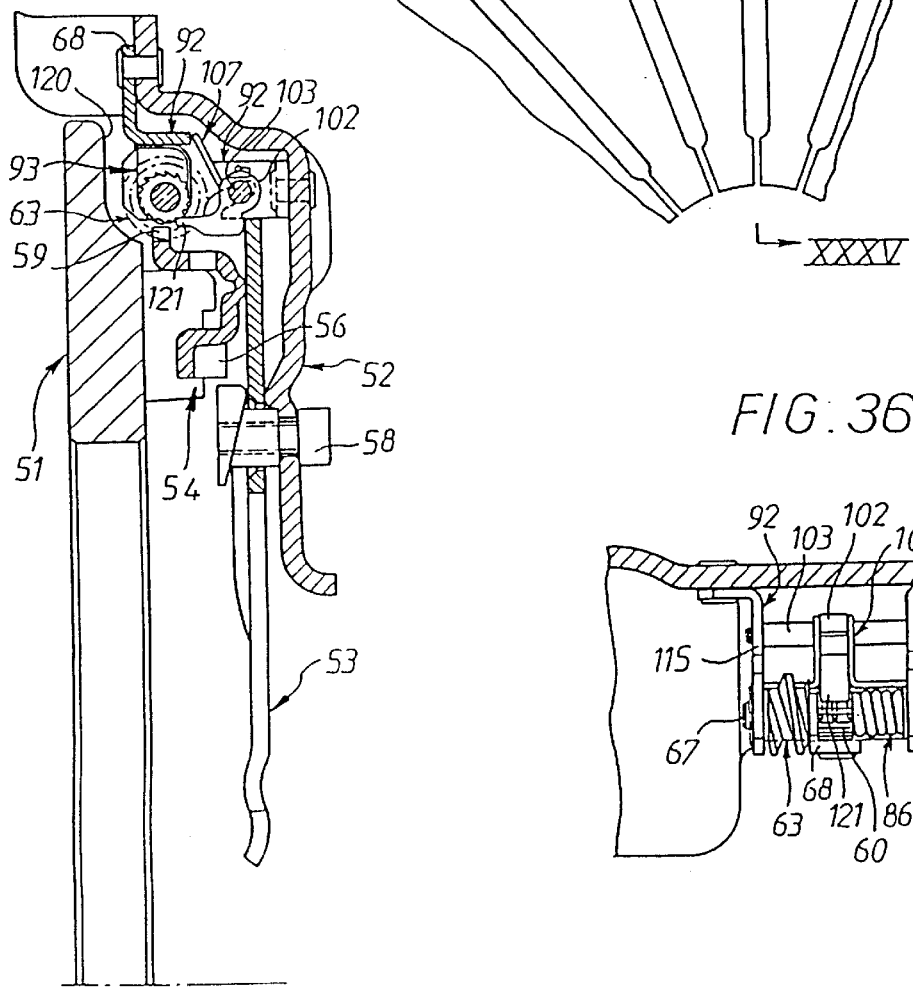
FIG. 35 is a partial view in cross section taken on XXXV—XXXV in FIG. 34.
Figure 36:
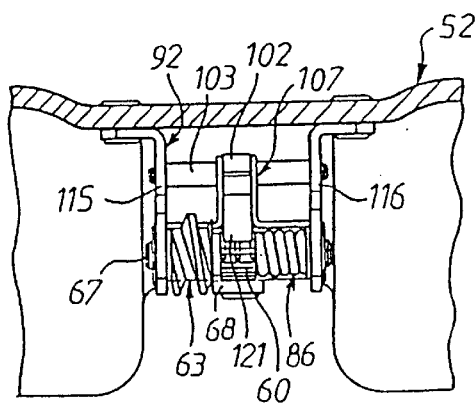
FIG. 36 is a partial side view in the direction of the arrow XXXVI in FIG. 34.
Figure 37:
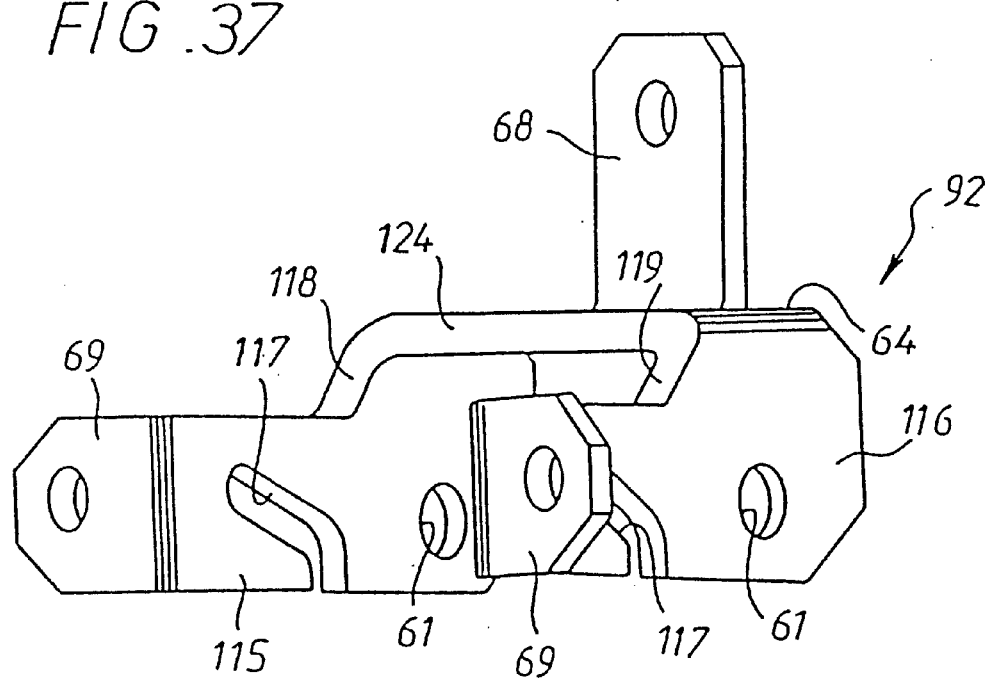
FIG. 37 is a perspective view of the support by itself.

In the embodiment of FIGS. 1 to 38, the clutch is of the push-to-release type, that is to say it is necessary to exert a pushing force, with the aid of a clutch release bearing not shown, on the inner ends of the fingers of the diaphragm 3, 53 so as to disengage (or declutch) the clutch, the said fingers constituting declutching means for counteracting, under the action of the clutch release bearing, the action of the resilient clutch engaging means constituted by the annular peripheral portion of the diaphragm. To this end, the base of the cover plate 2, 52 carries, firstly, a primary abutment consisting for example of a toroidal ring, or, in FIGS. 1, 21, 28, 35, a projecting element formed in the base of the cover plate at the inner periphery of the latter, and secondly, facing the primary abutment, a secondary abutment in the form of heads of short posts 8, 58 (FIGS. 1, 35), or in the form of a rolled crown piece carried by short posts 58 (FIGS. 21, 28), or in any other form. The diaphragm 3, 53 is mounted for tilting deflection, through the inner periphery of its Belleville ring, between the said primary and secondary abutments. It is in contact through the outer periphery of its Belleville ring with the engagement zones 14 to be described below.

In the embodiments of FIGS. 39 to 48, the clutch is of the pull-to-release type, so that it is necessary to work in traction on the inner ends of the fingers of the diaphragm 203 in order to disengage (or declutch) the clutch. The outer peripheral portion of the Belleville ring of the diaphragm bears on the base of the cover plate, that is to say, in FIGS. 40 and 48 on a toroidal ring, not denoted by a reference numeral, which is carried by the outer periphery of the base of the cover plate, or, in another version, on a projecting element press-formed in the said base. The inner peripheral portion of the said Belleville ring is in contact with an abutment 214 to be described below.

Figure 1:
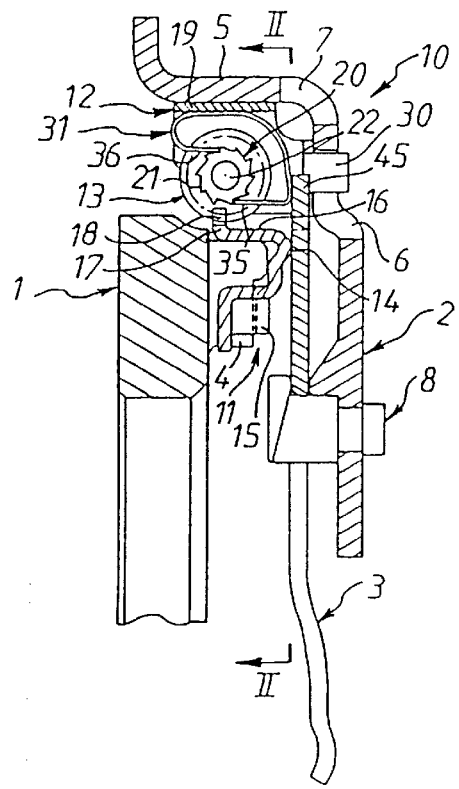
FIG. 1 is a view in cross section taken on II in FIG. 2, showing part of a clutch equipped with a wear compensating device in accordance with the invention.

With reference to FIGS. 1 and 2, these show a friction clutch mechanism, especially for a motor vehicle, which includes a pressure plate 1, arranged to cooperate with a friction disc, not shown, which carries friction liners at its outer periphery and which itself cooperates with a reaction plate. The reaction plate, not shown, is arranged to be mounted in rotation on a driving shaft such as a crankshaft of the internal combustion engine. The friction disc is fixed in rotation to a driven shaft such as an input shaft of the gearbox. The friction disc and the reaction plate are shown diagrammatically for example in the document U.S. Pat. No. 5,090,536 or FR-A-2 599 446, and the friction disc may be of the rigid or progressive type.

The pressure plate 1 is fixed in rotation to a hollow cover plate 2 by means of tangential tongues 9 which, being elastic, also constitute return means for biasing the pressure plate 1 towards the cover plate 2, which in this case is of metal and press-formed from plate.

The pressure plate 1, while being fixed in rotation to the cover plate 2, is therefore displaceable axially with respect to the cover plate 2 under the action of controlled, axially acting, resilient means, which in this example consist of a diaphragm 3 articulated on the cover plate 2 by means of short posts 8 carried by the base of the cover plate 2, the latter having a central hole. In the known way, the short post 8 has a profiled head which offers a secondary abutment to the diaphragm in facing relationship with a primary abutment which is formed by press-forming the base of the hollow cover plate 2. The diaphragm is mounted for pivoting movement between the said abutments.

In order to maintain the axially acting resilient means 3, constituting means for engagement of the clutch through the peripheral portion, in the form of a Belleville ring, of the diaphragm, in a position when the clutch is engaged which is independent of the wear of the liners of the friction disc, and to a lesser extent the wear in the pressure plate 1 and the reaction plate, the so-called friction faces of which become worn by contact with the liners of the disc, a wear compensating device 10 is provided.

The wear compensating device 10 comprises ramp means 11 which are disposed circumferentially; more precisely, these ramp means 11, which are best seen in FIGS. 2 and 10, consist of an annular ring of press-formed sheet metal, such as to have ramps 15 disposed circumferentially; the said ring also has engagement zones 14 which consist of the rounded upper edge of arcuate press-formed projecting elements centred on the axis of the clutch and located radially on the outside with respect to the ramps 15.

The pressure plate 1 has, in this example formed integrally by moulding, on its surface that faces towards the base of the cover plate 2, and radially outside the short posts 8, pads 4 which are spaced apart circumferentially at a distance from each other which corresponds to the distance that circumferentially separates two successive ramps 15, with each of the pads 4 being arranged to cooperate with a ramp 15.

The ramp means 11 are located axially between the diaphragm 3 and the pressure plate 1, so that the pads 4 receive the ramps 15, and the diaphragm 3 cooperates with the engagement zones 14, which thus constitute the abutment means through which the diaphragm 3 acts on the pressure plate 1.

One of the engagement zones 14 of the ramp means 11 is extended (FIGS. 1 and 13) at its outer periphery by a flange 16 which is parallel to the axis of the clutch and which terminates in a return portion 17 which is transverse, that is to say it lies in a plane at right angles to the axis of the clutch, and which has at its periphery a set of teeth 18, such that the engagement zones 14 can be continuous, and the flange is centred by a thickened portion in the form of a boss of the pressure plate 1.

Preferably the axial flange 16 of the ramp means 11 has apertures 16A, which are rectangular in this example, for facilitating ventilation of the ramp means.

The axial flange 16 is in intimate contact through its inner periphery with the outer periphery of a boss of the pressure plate, so that the axial flange 16 centres the ramp means 11 with respect to the pressure plate 1. More precisely, the pressure plate 1 has at its outer periphery a divided boss which projects towards the base of the cover plate. This boss, which is annular in form, serves as a centring means for the flange 16.

The wear compensating device 10 also includes a ratchet wheel 20 having ratchet teeth 21 and being fixed to a shaft 22, which also carries a worm 13; the angle and pitch of the worm 13 are matched to the set of teeth 18 of the ramp means 11; the worm 13 is arranged to cooperate with the set of teeth 18 under the conditions which will be described later herein.

The shaft 22 of the ratchet wheel 20 is carried in rotation by a support piece 12, which is best seen in FIGS. 6 to 8 and which is fabricated by stamping out and bending in metal plate, being U-shaped with a spine portion 19 and two wing portions 23, 24 for supporting the shaft 22; for this purpose, each of the wing portions has a circular hole 25 which is matched to the diameter of the shaft 22.

The wing portions 23, 24 of the support piece 12 are extended outwards by L-shaped arms 27, 28, which extend towards each other at right angles to the spine portion 19, and each of which terminates, when the support piece 12 is mounted on the cover plate 2, in a C-shaped end portion 29 and 30 respectively, the two C-shaped end portions 29 and 30 being disposed back to back and in line with each other.

The cover plate 2 has a radial projecting element 5 which defines a housing for the wear compensating device 10; this housing communicates with the outside through a transverse aperture 6 formed through the transverse wall of the cover plate 2; the edges of this transverse aperture 6 are adapted to receive the C-shaped end portions 29 and 30 of the support piece 12 which are seamed on these edges as shown in FIG. 3, and which therefore secure the support piece 12 on the cover plate; FIGS. 1, 2 and 3 show that the support piece 12 fits perfectly in the housing defined by the radial projecting portion 5, the said housing and the support piece 12, which is of metal in this example, these elements having complementary forms; at the junction between the transverse wall of the cover plate and the extension of the cylindrical skirt of the cover plate that bounds the said housing, an aperture 7 facilitates ventilation of the device 10. The support piece 12 is mounted radially outside the pressure plate 1.

The support piece 12 is adapted to receive a resilient member 31 which is of smaller thickness than the support piece 12, as is best seen in FIGS. 4 and 5; the resilient member 31, which is of metal in this example, has the general form of a crook, each end of which carries an inwardly directed return portion; more precisely, the portion 32 of the crook having the greater length is extended in width towards its end, terminating in a return portion 34 which carries a terminal controlled tongue 35; the shorter portion 33 of the crook has a return portion 36, which will be called a non-return catch and which extends generally parallel to the control tongue 35 but spaced away from the latter, in such a way that, when the resilient member 31 and the ratchet wheel 20 are mounted in the support piece 12, the non-return catch 36 and the control tongue 35, which constitutes a control member, each cooperate with the root of a tooth, the two teeth concerned being in this example substantially diametrically opposed as shown in FIG. 1; for its mounting in the support piece 12, the resilient member 31 carries laterally extending stirrup arms 37, 38, disposed on either side of the resilient crook-shaped part and extending orthogonally with respect to the latter, while the free ends of the stirrup arms 37, 38 have through holes 39, the diameter of which corresponds to that of the shaft 22.

When the resilient member 31 is mounted in the support piece 12, the free ends of the arms 37, 38 lie between the wing portions 23, 24 of the support piece 12 and along these latter; a helical compression spring 40 is placed between the ratchet wheel 20 and the free end of the arm 38, being wound around the shaft 22; the worm 13 and the ratchet wheel 20 are formed in the same component; as can be seen, the support piece 12 equipped with this component, together with the resilient member 31, spring 40 and shaft 22, constitutes a sub-assembly ready to be installed within the cover plate 2.

The helical spring 40 constitutes the resilient means for taking up wear, as described below; the ratchet wheel 20 is in line with the non-return catch 36 which, by cooperation with the ratchet teeth 21 of the ratchet wheel 20, prevents the ratchet wheel and the worm 13 from turning in the anticlockwise direction with reference to FIGS. 1 and 16 to 19.

Since the support piece 12, carrying the ratchet wheel 20, the worm 13 and the helical spring 40, is fixed to the cover plate 2, the diaphragm 3 is displaced with respect to it during operations of disengaging and re-engaging the clutch; the diaphragm 3 carries at its periphery a radial finger 45, FIG. 9, referred to as an actuator, which projects radially outwardly from the Belleville ring portion of the diaphragm 3, for cooperation with the widened zone of the wider portion 32 of the resilient member 31; it will be understood that, because of this arrangement, during the tilting deflection of the diaphragm 3 during disengaging and re-engaging of the clutch, the actuator 45 displaces this portion 32 from right to left with respect to FIG. 1, and the control tongue 35, by cooperation with the teeth 21 of the ratchet wheel 20, is caused to turn the ratchet wheel 20 in the clockwise direction; when the actuator 45, on the return movement, is displaced from left to right, the elasticity of the portion 32 of the resilient member 31, together with the inclination of the teeth 21, cause the said portion 32 to be displaced towards the right, so as to climb on the teeth 21 which are held fixed in rotation by the non-return catch 36 and/or by internal friction.

The wear compensating device which has just been described operates in the following way, given that the system consisting of the set of teeth 18 and the worm 13 is irreversible, with the worm 13 being able to drive the teeth 18 but not the other way round.

FIG. 1 shows the clutch engaged, with the liners of the friction disc being new and being gripped between the reaction plate, not shown, and the pressure plate 1. In this position, the control tongue 35 and the non-return catch 36, being both elastically deformable, have their ends at the root of a tooth of the ratchet wheel 20.

Figure 16:
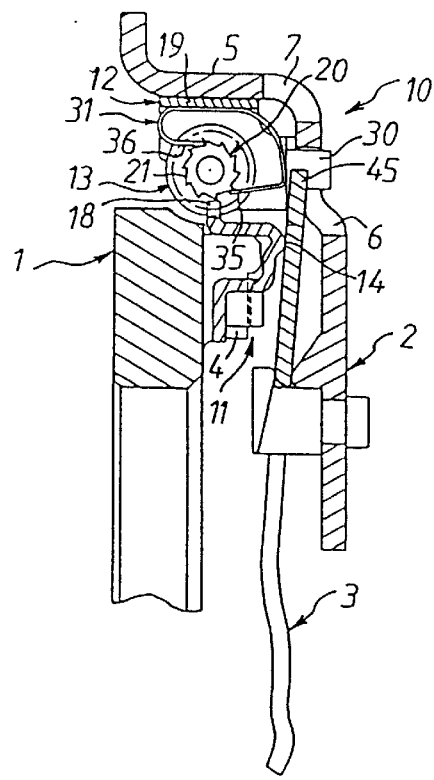
FIGS. 16 to 19 are views in partial cross section similar to FIG. 1 and showing various positions of the constituent elements of the clutch.

When the clutch is disengaged, the diaphragm 3 has deflected about the short posts 8, thereby taking its actuating finger 45, at its periphery, towards the base of the cover plate 2; in its displacement the actuator 45 progressively releases the control tongue 35, the end of which follows the inclined ramp constituted by the tooth at the root of which it was engaged in the preceding step, the teeth 21 of the ratchet wheel 20 being so designed that, during the course of this declutching operation with new liners, the end of the control tongue 35 does not jump a tooth, the non-return catch 36 retaining the ratchet wheel 20; this result is obtained by the portion 32 of the resilient member 31 coming into abutment against the support piece 12, and more precisely against the arms 27, 28 of the support piece 12 which constitute a control abutment, and, in accordance with one feature of the invention, the arms limit the return travel of the said portion 32 regardless of the travel of the actuator 45 of the diaphragm 3, as is shown in FIG. 16.

Figure 17:
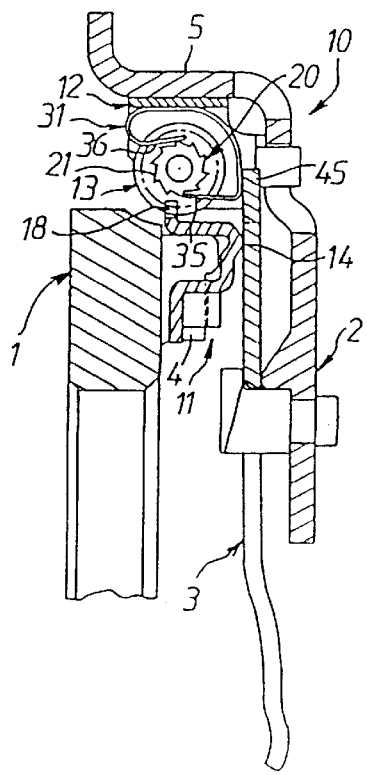
Figure 18:
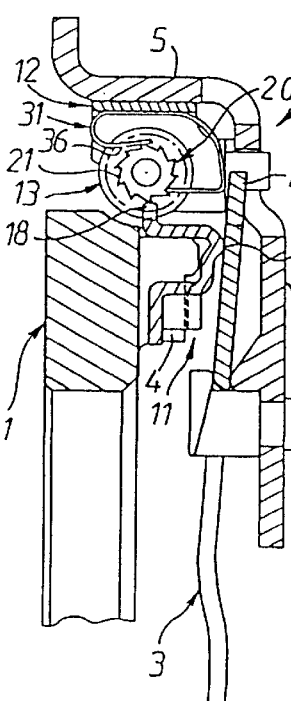

As the liners become worn, the pressure plate 1, still subjected to the axial force from the diaphragm 3, approaches in the known way the reaction plate which is fixed axially, as is the cover plate 2; the actuator 45 of the diaphragm 3 then moves towards the reaction plate, that is to say towards the open end of the cover plate 2, displacing in its movement the control tongue 35; the ratchet wheel 20 turns about its axis in the clockwise direction, in which direction the non-return catch 36 does not perform its function but can jump from one tooth to another; the clutch is shown in FIG. 17 in its engaged condition with worn liners. This driving of the ratchet wheel 20 in rotation also causes the worm 13 to turn by a slight amount on its shaft; since the ramp means 11 are immobilised with respect to the cover plate 2 because of the load exerted by the diaphragm 3, the worm 13, which meshes with the set of teeth 18 of the ramp means 11, exerts its screw action to some extent on the teeth 18, compressing the helical spring 40, the direction of the thread of the worm 13 being determined accordingly.

During the declutching operation which follows the phase of wear which has just been described, the pressure plate 1 releases the liners, moving away from them under the action of the tangential tongues 9, which return towards the base of the cover plate 2 the pressure plate 1 together with the ramp means 11, which are in contact with the diaphragm 3 through their engagement zones 14 and with the pads 4 of the pressure plate 1 through their ramps 15. The helical spring 40 urges the worm 13 towards the wing portion 23 of the support piece 12, from which it had become disengaged in the wear phases, that is to say from right to left with reference to FIGS. 2 and 3; since the load of the diaphragm 3 is no longer applied on the ramp means 11, the only force to be overcome in order that the ramp means 11 can be turned with respect to the pressure plate 1 is the friction force generated by the return force of the tangential tongues 9; if the load of the helical spring 40 is sufficient to overcome this force, the spring 40 then displaces the worm 13, which is prevented from turning on itself by the pressure from the non-return catch 36, and the worm will drive the teeth 18: by turning on themselves, the ramps 15 of the ramp means 11, by cooperation with the pads 4 of the pressure plate 1, will move the pressure plate 1 away from the base of the cover plate 2, thus increasing the axial distance between the working surface of the pressure plate 1 and the engagement zones 14 of the ramp means 11, and thereby taking up (compensating for) at least part of the displacement of the pressure plate 1 which is due to wear in the liners. Because the load of the helical spring 40 is a function of the amount by which it will have become compressed by the worm 13 during the wear phases, it will be seen that several clutch engaging and disengaging operations may be necessary before the wear compensating device 10 can enter a phase in which wear has properly been taken up, this being a function of the relative dimensioning of the components concerned; by way of example, these latter may be made in such a way that this wear-compensated phase proper occurs for the first time only after wear corresponding to three tenths of a millimeter has taken place; in FIG. 18, which corresponds to the clutch being disengaged with worn liners, it is supposed that no wear has been taken up; it is also supposed that the amount of wear has been sufficient for the rotation of the ratchet wheel 20 to have been enough for the control tongue 35 to have jumped by one tooth on its return movement.

Figure 19:
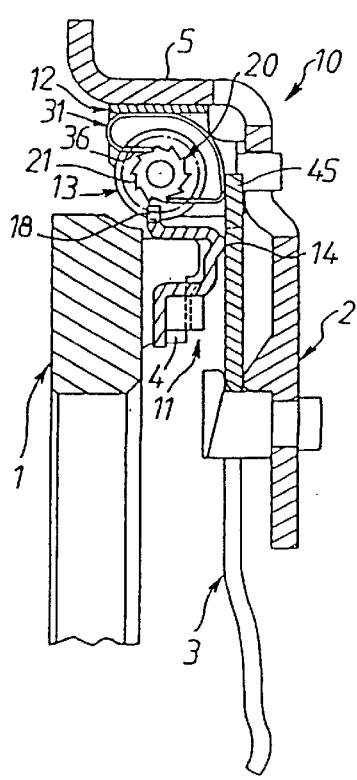
Figure 20:
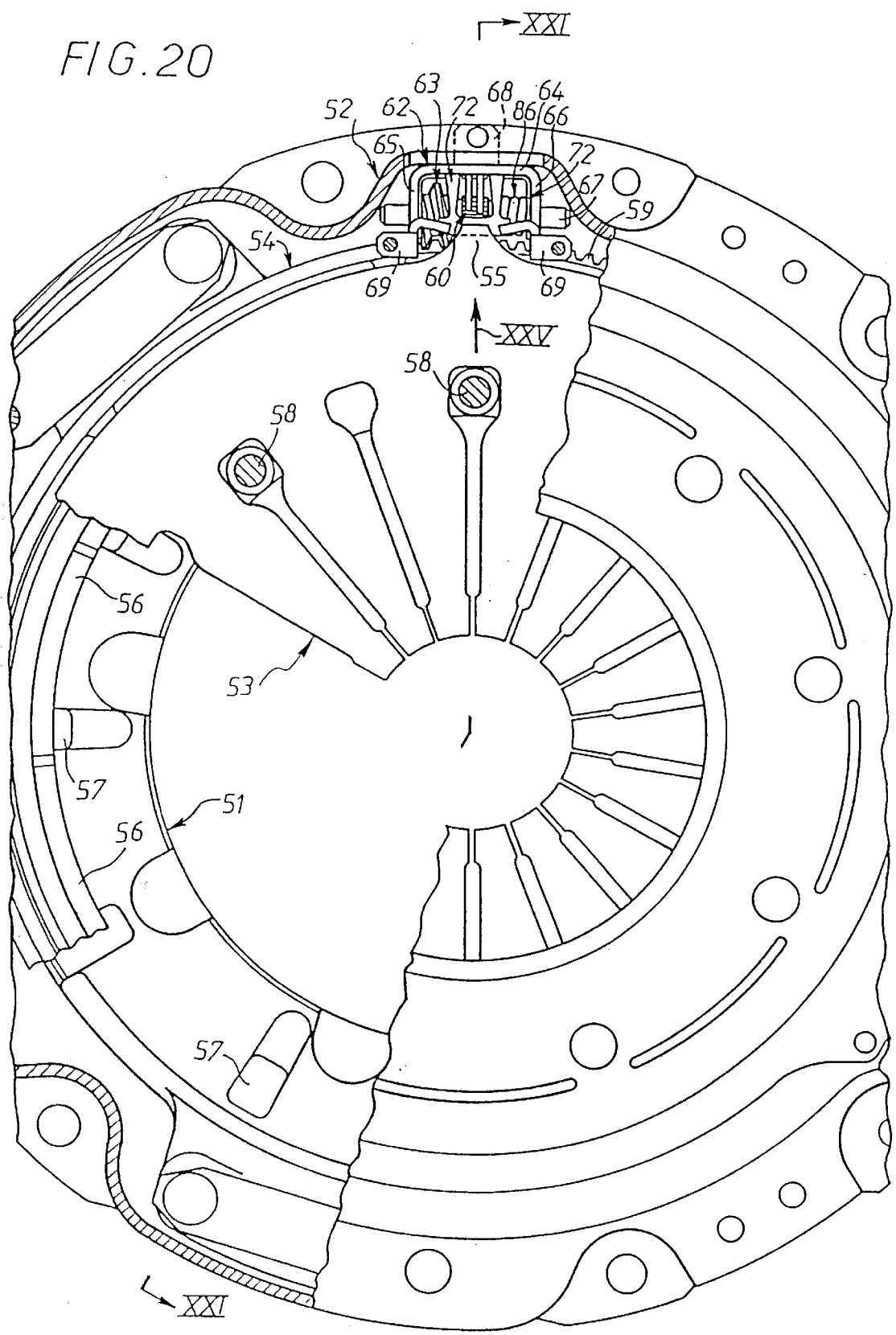
FIG. 20 is a plan view showing part of a clutch equipped with another version of a wear compensating device in accordance with the invention.

During the clutch engaging operation, the control tongue 35, under thrust from the actuator 45, causes the ratchet wheel 20 to turn, and the ramp means 11, which are no longer gripped by the diaphragm 3, rotate and take up the wear in the liners; at the end of the wear take-up operation, FIG. 19, the diaphragm 3, the ratchet wheel 20, the non-return catch 36 and the control tongue 35 regain the position which they occupied in FIG. 1.

In the version which has just been described, the worm 13 and the ratchet wheel 20 are formed in one piece; the worm 13 could of course be a separate member provided with a bore, the said bore and the shaft itself being so arranged that the worm is able to slide along the shaft while being fixed to the said shaft in rotation. FIGS. 20 to 26 show another version of the wear compensating device; in these Figures, there can be seen a clutch comprising a pressure plate 51, a cover plate 52, a diaphragm 53 having an actuating finger 55 and articulated on the cover plate 52 by means of short posts 58 carrying a rolled crown piece which offers a secondary abutment to the diaphragm 53; ramp means 54, including ramps 56 which cooperate with pads 57 of the pressure plate, and a set of teeth 59 which cooperates with a worm 63, which is itself fixed in rotation to a ratchet wheel 60 having a shaft 67 on which a spring 86 is wound. The support piece 62, which is metallic in this example, is mounted radially outwardly of the pressure plate 1.

In this example, the support piece 62, which can be seen best in FIG. 23, is U-shaped and has a spine portion 64 and two wing portions 65 and 66, each of which has a hole 61 arranged to receive the shaft 67 of the device; the spine portion 64 carries, at right angles to it, an outwardly directed lateral lug 68, which is adapted to be fixed on the outer flange of the cover plate 52 by means of a rivet. The cover plate 52 has an aperture for passage through it of the spine portion 64, and is of simplified form.

The wing portions 65 and 66 of the support piece 62 have, on the side opposite to that on which the lug 68 is situated, an axial extension, the end of which is bent outwardly so as to constitute a fastening lug 69, parallel to the above lug 68 and arranged to be fixed to the base of the cover plate 52 by means of a rivet 70; on their portion which faces towards the spine portion 64, the said extensions are provided with return portions 71 which extend towards each other and are generally parallel to the spine portion 64, being arranged to constitute control abutments, the purpose of which will appear below; the mutually facing ends of the said return portions 71 are spaced apart by a sufficient distance to enable the actuator 55 to be displaced without any damage during operations of engaging and disengaging the clutch.

In the present case, the resilient member 72, which can be seen best in FIG. 24, is in the form of a saddle, and comprises a flat elongated body 73 which carries at each of its ends an arm 74 having a hole 75 for receiving the shaft 67; the two arms 74 are parallel and extend on the same side and generally at right angles with respect to the body 73.

On one of its longitudinal edges, the body 73 is extended in length by an oblique extension 84 on the same side as that on which the arms 74 are located; slots 82 and 83, formed in the body 73, limit the extension 84 with respect to the ends of the body 73 carrying the arms 74; in addition, these slots 82 and 83 give a certain elasticity to the extension 84.

The free end of the extension 84 is provided with a return portion 85 which is continued by a control tongue 76 projecting towards the body 73 and generally parallel to the latter.

An aperture 77 is formed in the extension 84; this aperture 77, together with slots 79, 80 and 81 in the body 73, defines a non-return catch 78 consisting of two flat fingers 78A and 78B; the free ends of these latter extend generally at right angles to the body 73 and have slightly different lengths; the difference between these lengths is such that, when the fingers 78A, 78B are in resilient engagement on the ratchet wheel 60, they are offset parallel to the arms 74 by an amount less than the length of one tooth of the ratchet wheel 60: thus, the effectiveness of the non-return function is improved with respect to the solution in which the ratchet wheel only cooperates with a single non-return finger.

This version operates in the same way as the preceding one; it should be noted that here, during the declutching operation, the course of travel on return, or arming, of the control tongue 76 is limited by the extension 84- of the resilient member 72 coming into abutment against the return portions 71 of the support piece 62, the thickness of which is greater than that of the metal resilient member 72.

FIGS. 27 to 33 show another version; in these Figures, those parts which are identical to those in the preceding version carry the same reference numerals as the latter, and will not therefore be described. In this case, the non-return function on the one hand and the function of control for the ratchet wheel 60 on the other hand, are not provided by the same component as in the preceding embodiments.

Figure 31:
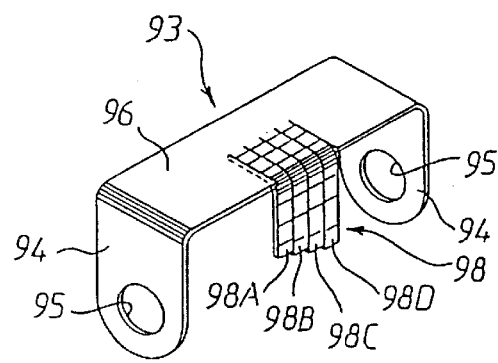

In the present case, the resilient member comprises two distinct members; a first member, for the non-return function, is a stirrup member 93, which in this example is of metal, thinner than the support piece 92 and seen best in FIG. 31, being in the form of a U, the two wing portions 94 of which carry holes 95 for supporting the shaft 67; the spine portion 96 of this stirrup member is, on one of its sides, in the vicinity of its middle portion, which is cut so as to form strips 98A–D, which extend in a direction parallel to that of the wing portions 94 and which are extended by right-angled return portions projecting on the same side as the wing portions 94 with respect to the spine portion 96, generally at right angles to the said spine portion 96; the said return portions have lengths which increase slightly in succession; the strips 98A–D constitute a non-return catch 98 which is arranged to cooperate with the ratchet wheel 60.

In this example, the strips 98A–D, of which there are four, give the non-return function an even greater effectiveness than in the preceding version having two fingers.

Figure 32:
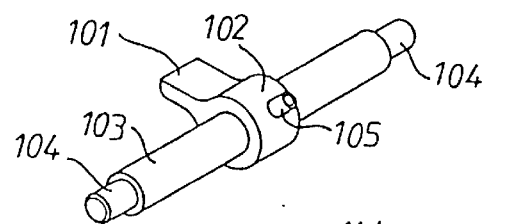
Figure 33:
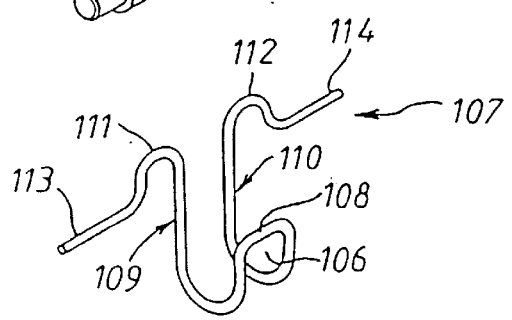
Figure 34:
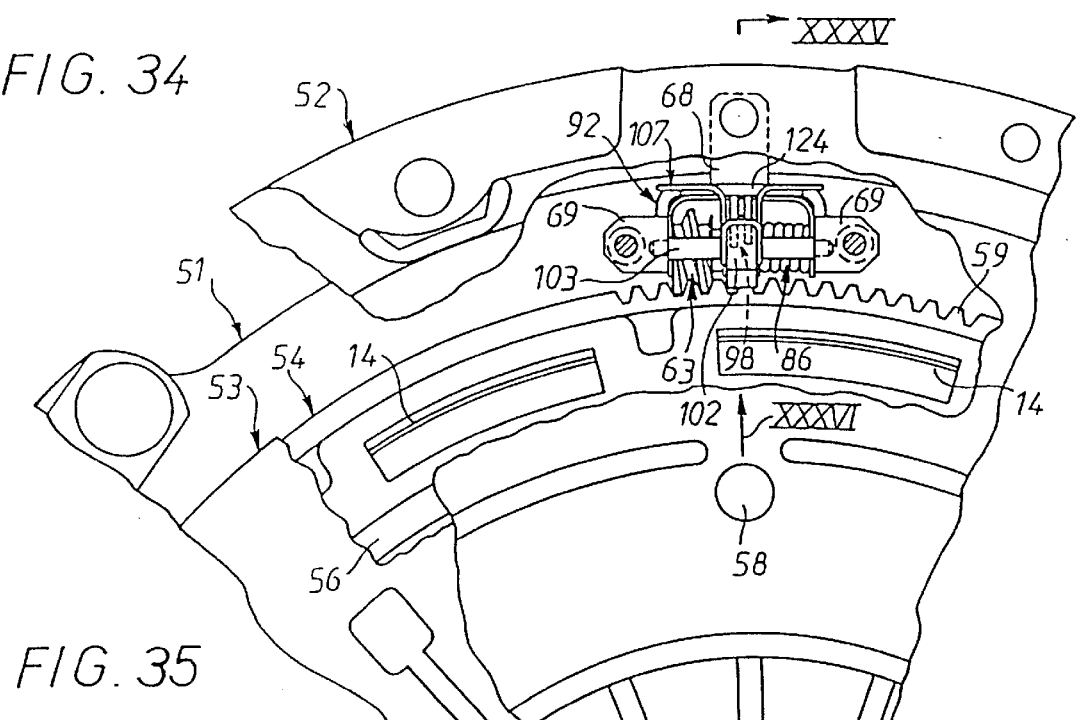
FIG. 34 is a partial plan view of a clutch equipped with yet another version of the wear compensating device according to the invention.

The second component, for the function of controlling the ratchet wheel, is best seen in FIG. 32, and is a finger 101 carried by a cylindrical sleeve 102 force-fitted on a shaft 103 in the middle zone of the latter, which shaft 103 carries at each of its ends a zone of reduced diameter, or pivot, 104; the sleeve 102 and its finger 101 are fixed in rotation to the shaft 103 by means of a cotter pin 105 which passes diametrically through the sleeve 102 and the shaft 103, with the cotter pin 105 projecting out of one side of the sleeve 102 so as to constitute an end stop for the base portion 108 of an open loop 106, FIG. 33, of a wire spring 107 which is configured like a coathook; the two free arms 109 and 110 of the loop 106 extend parallel to each other over a first portion of their length, defining an open counter-loop while lying in planes at right angles to the base portion 106, while each of them, over a second portion of its length in which it extends away from the other one while remaining in a common plane parallel to that of the open loop 106, defines a loop 111, 112 and an axially orientated terminal segment 113, 114, respectively.

Figure 30:
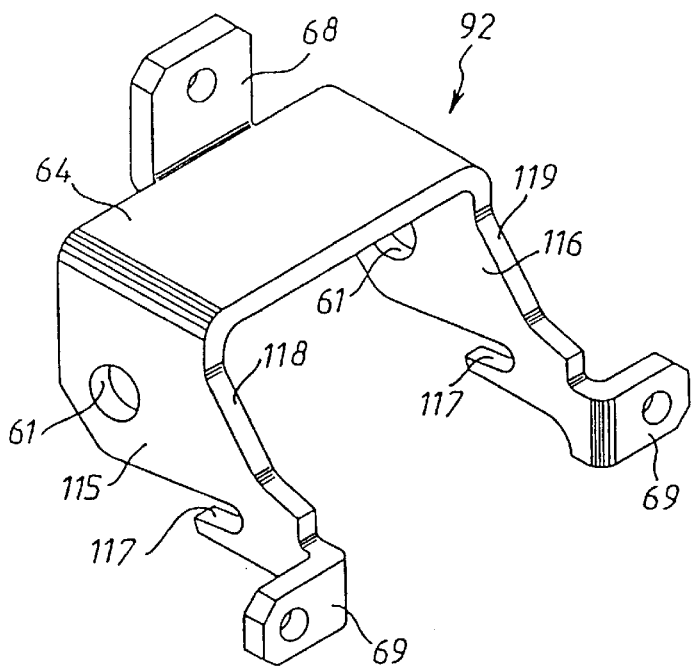
FIGS. 30 to 33 are perspective views showing, respectively, the support, the non-return catch, the control tongue and its associated spring.

In this example the support piece 92, which is best seen in FIG. 30, includes wing portions 115 and 116 which carry the lugs 69, and which have, on their edge opposite to the spine portion 64, slots 117 which are open to the same side as the holes 61 for the shaft 67; these slots 117 make a slight angle with the plane of the spine portion 64, and their width is adapted for receiving the pivots 104 of the shaft 103 of the control finger 101.

When the assembly is mounted as shown in FIGS. 27, 28 and 29, the terminal segments 113, 114 of the wire spring 107 are in engagement against the upper portion 118, 119 of the wing portions 115, 116 of the support member 92 respectively, while the base portion 108 of the open loop 106, in engagement on the end stop 105, exerts on the control finger 101 a torque which applies the end of the finger 101 on the root of a tooth of the ratchet wheel 63, with one of the strips 98A–D of the non-return catch 98 being similarly on the root of another tooth of the said ratchet wheel 63.

More precisely, the said torque applies the finger 101 on the teeth of the ratchet wheel 63, while, when the clutch is engaged, FIG. 28, the actuating projecting element 55 of the diaphragm 53, bearing on the sleeve 102 which carries the finger 101, pushes the latter on the root of the tooth and causes the ratchet wheel 60 to turn during wear; during a declutching operation, the actuating projecting element 55 moves closer to the base of the cover plate 52, so releasing the finger 101, which, since an axial component of the force from the wire spring 107 is applied to it, follows the diaphragm by rising along the tooth concerned, which is immobilised by the nonreturn catch 98; in this return movement, the finger 101 and its shaft 103 follow the diaphragm 53 and then part company with the latter when the pivots 104 of the said shaft 103 abut in the base of the slots 117 of the support piece 92, which constitutes a control abutment.

Operation of this device is identical to that of the devices described above.

FIGS. 34 to 38 show a further version of a clutch in accordance with the invention, which is different from the preceding version in a few ways.

Figure 38:
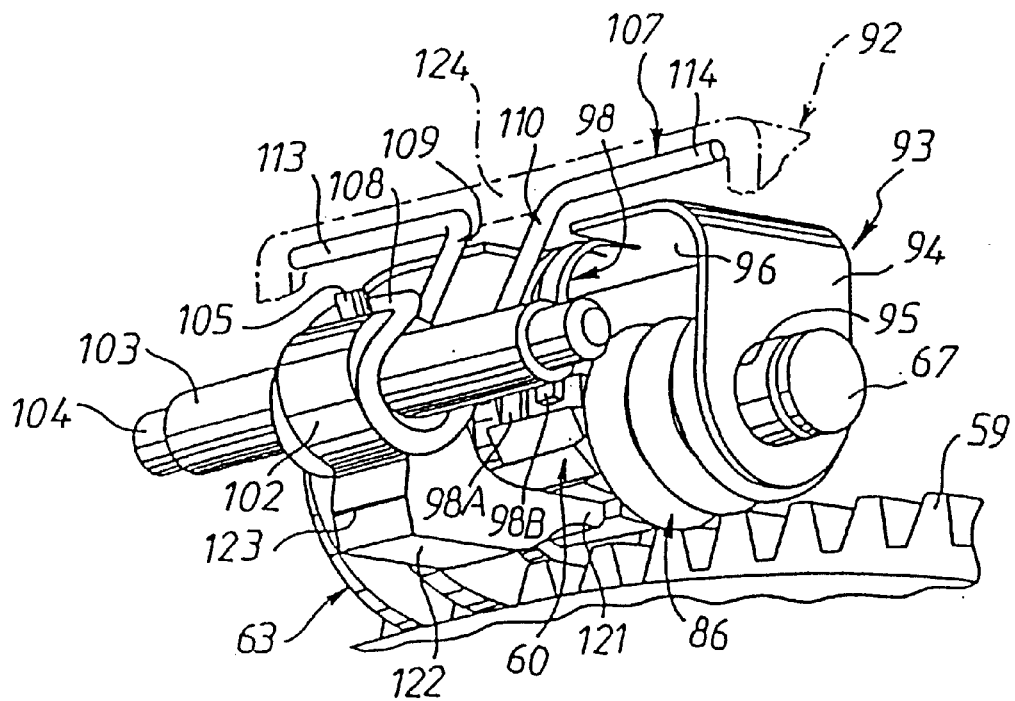
FIG. 38 is a perspective view of the device without its support.

In this case the pressure plate 51 has, near its outer periphery, a rebate 120 facing the cover plate and enabling the wear compensating device to be accommodated closer to the axis of the clutch, which simplifies the cover plate 52; in addition, this enables the control finger 121 described below to be actuated directly by the outer periphery of the diaphragm 53; this avoids the provision on the latter of an actuating projecting element, and therefore makes its manufacture easier; for this purpose, the control finger 121, FIG. 38, is the thin end of a member 122 in the form of a hammerhead, the claw of which has an edge 123 with which the outer periphery of the diaphragm 53 cooperates.

Here, the free portions 109, 110 of the wire spring 107 do not include loops such as the loops 111, 112 in the preceding version, and the terminal segments 113, 114 bear on the inclined edge 124 of the spine portion 64 of the support piece 92.

In this example the non-return catch 96 comprises only two strips, 98A and 98B.

With reference to FIGS. 39 to 48, these show a friction clutch mechanism, especially for a motor vehicle, which comprises a pressure plate 201 adapted to cooperate with a friction disc, not shown, which carries friction liners at its outer periphery and itself cooperates with a reaction plate. The reaction plate, not shown, is adapted to be mounted on, and for rotation with, a driving shaft such as the crankshaft of the internal combustion engine. The friction disc is fixed in rotation to a driven shaft such as the input shaft of the gearbox.

The pressure plate 201 is fixed in rotation to a hollow cover plate 202 by means of tangential tongues 209, which, being elastic, also constitute return means for biasing the pressure plate 201 towards the cover plate 202.

The pressure plate 201, while being fixed in rotation to the cover plate 202, is accordingly displaceable axially with respect to the cover plate 202 under the biasing action of controlled axially acting resilient means, which in this example comprise a diaphragm 203 which bears on the cover plate 202 through its outer periphery, the clutch being here of the pull-to-release type, the operation of declutching being effected by acting on the ends of the fingers of the diaphragm in the direction of the arrow F in FIG. 40.

In order to maintain the axially acting resilient means 203, when the clutch is engaged, in a position independent of wear in the liners of the friction disc, and to a lesser extent wear in the pressure plate 201 and the reaction plate, the friction surfaces of which become worn in contact with the liners of the disc, a wear compensating device is provided which includes ramp means 211 disposed circumferentially; more precisely, these ramp means 211, FIGS. 40 and 41, are of metal, being made by press-forming, and comprise an annular ring having ramps 215 disposed circumferentially on its face that faces towards the pressure plate 201; on its opposite face, the said ring has an engagement zone 214 which consists of a rounded upper edge disposed on an arc of a circle centred on the axis of the clutch. The said engagement zone 214 may of course be either continuous or discontinuous.

The pressure plate 201 has, on its surface facing towards the base of the cover plate 202, pads 204 which in this example are formed integrally by moulding and which are spaced apart circumferentially by a distance which corresponds to the distance circumferentially separating two successive ramps 215, each of the pads 204 being adapted to cooperate with one ramp 215.

The ramp means 201 are located axially between the diaphragm 203 and the pressure plate 201, in such a way that the pads 204 receive the ramps 215, and the diaphragm 203 cooperates with the engagement zone 214, which thus constitutes the abutment means through which the diaphragm 203 acts on the pressure plate 201.

The inner periphery of the ramp means 211 is provided with a set of radial teeth 218.

The wear compensating device also includes a ratchet wheel 220 having ratchet teeth 221, which is mounted for rotation about a shaft 222 which also carries a worm 213; the angle and pitch of the worm 213 are matched to the set of teeth 218 of the ramp means 211; the worm 213 is arranged to cooperate with the set of teeth 218 under the conditions which will be described later herein.

Here, the teeth 221 are formed in the outer periphery of the thread of the worm 213. This arrangement, which is best seen in FIGS. 42 and 43, is both inexpensive and simple.

Figure 42:
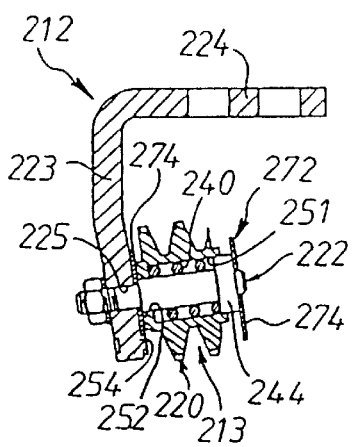
FIG. 42 is a view in cross section of the support showing the worm.
Figure 43:
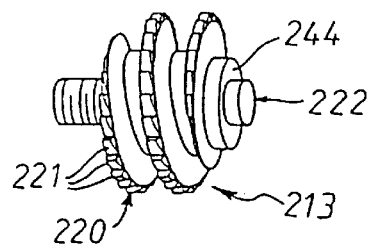
FIG. 43 is a perspective view of the worm incorporating the ratchet wheel.

The shaft 222 is carried in rotation by a support piece 212, which is best seen in FIGS. 41 and 42 and which is made of press-formed and bent sheet metal, being generally L-shaped and having two wing portions 223, 224, one of which, 223, is arranged to support the shaft 222, with the other one, 224, being arranged to fix the support piece 212 on the cover plate 202; for this purpose, the wing portion 223 has a circular hole 225 which is arranged to receive the end of the shaft 222, which is threaded in this example so as to receive a fastening nut. In a modified version not shown, the wing portion 223 is formed with a screw thread which receives the threaded end of the shaft 222, and this enables the nut to be dispensed with.

When the support piece 212 is mounted on the cover plate 202, the wing portion 224 is fixed on the base of the cover plate 202, while the wing portion 223 extends through the diaphragm 203 between two of its fingers, which may if necessary be spaced apart circumferentially by a greater amount than are the other pairs of fingers.

Figure 44:
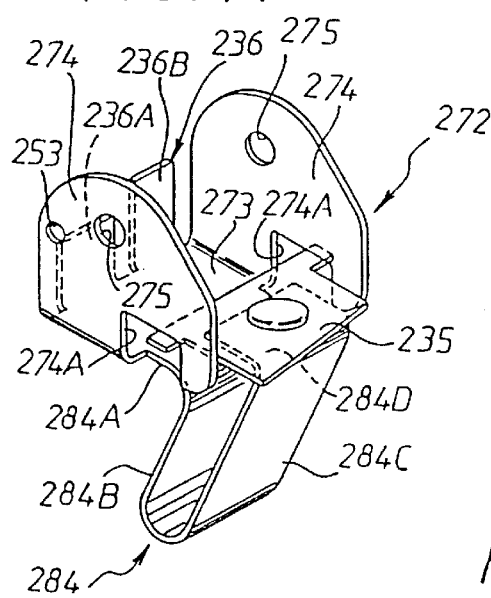
FIG. 44 is a perspective view of the resilient member.

The support piece 212 is adapted to receive a resilient member 272, which in this example is of metal and is of smaller thickness than the support piece, as is best seen in FIG. 44; the resilient member 272 is in the general form of a saddle and comprises a flat body 273 carrying at each of its ends an arm 274 having a hole 275 for receiving the shaft 222; the two arms 274 are parallel to each other and extend on the same side and generally at right angles with respect to the body 273. On one of its longitudinal edges, the body 273 is extended, between the arms 274, by an extension 284 which comprises a first portion 284A that extends the body 273 lengthwise, a second portion 284B which extends in the direction away from that of the arms 274, making an acute angle with the body 273, a third portion 284C which makes a U with the second portion 284B and which extends parallel to the latter, and a fourth portion 284D directed towards the body 273 and parallel to the latter, at a level which is slightly higher so that it extends between the arms 274; this fourth portion 284D receives, for example by riveting, a T-shaped plate element, the foot 235 of which constitutes a control tongue 235; each of the two arms of the T passes through a slot 274A formed in each of the arms 274, so that the course of travel of the control tongue 234 parallel to the body 273 is limited, at least in its spacing from the body 273; on its longitudinal edge opposite to that on which the extension 284 is situated, the body 273 carries a non-return catch 236, which in this example consists of two flat fingers 236A, 236B of slightly different lengths, extending generally at right angles to the body 273 on the same side with respect to the latter as that on which the arms 274 extend; the inner edge of the control tongue 235 and the free ends of the fingers 236A and 236B are spaced away from each other and are so positioned that, when the resilient member 272 and the ratchet wheel 220 are mounted in the support piece 212, the non-return catch 236 and the control tongue 235 each cooperate elastically with the root of a tooth of the ratchet wheel 220. The arm 274 of the resilient member 272, in engagement on the wing portion 223 of the support piece 212, has a hole 253, FIG. 44, which is arranged to cooperate with a spigot element 254, FIG. 42, which is arranged on the inner face of the said wing portion 223 for angular positioning of the resilient member 272 with respect to the support piece 212. The spigot element 254 may be replaced by a dowel or any other projecting element.

The shaft 222 carries a collar 244 in the vicinity of its unthreaded end; around the shaft 222, there is fitted a helical spring 240 which constitutes the resilient means for taking up wear as described below; in this example, the spring 240 is wound around the shaft 222 and is located in a housing 251 formed within the interior of the ratchet wheel 220 (or worm 213); the ratchet wheel 220 (or worm 213) is centred with respect to the shaft 222, on one side, by bearing on the collar 244 of the said shaft, and on the other side by an internal circular ring element 252 with which it is provided; the spring 240 is thus located axially between the said ring element 252 and the collar 244 of the shaft 222; the ratchet wheel 220 is aligned with the non-return catch 236, which, by cooperation with the ratchet teeth 221 of the ratchet wheel 220, prevents rotation of the ratchet wheel 220, and therefore of the worm 213, in the anti-clockwise direction with reference to FIG. 40.

Since the support 212, carrying the ratchet wheel 220, the worm 213 and the helical spring 240, is fixed to the cover plate 202, the diaphragm 203 is displaced with respect to the latter during the operations of disengaging and re-engaging the clutch; the diaphragm 203 is so arranged as to cooperate by means of one of its fingers, in this example the finger 250, with the control tongue 235 of the resilient member 272; it will be understood that, because of this arrangement, during the deflection of the diaphragm 203 during the clutch operations, the control tongue 235 is displaced from right to left with reference to FIG. 40, and, by cooperation with the teeth 221 of the ratchet wheel 220, is caused to rotate the ratchet wheel 220 in the clockwise direction; when the finger 250 of the diaphragm deflects to the right during the declutching operation, the elasticity of the resilient member 272 and the inclination of the teeth 221 causes the control tongue 235 to be displaced towards the right, climbing on the teeth 221 which are held fixed in rotation by the non-return catch 236 and/or by internal friction.

The wear compensating device which has just been described operates as follows, given that the system consisting of the set of teeth 218 and the worm 213 is irreversible, the worm 213 being able to drive the set of teeth 218, but not the other way round.

FIG. 40 shows the clutch engaged, with the liners of the friction disc being new and gripped between the reaction plate, not shown, and the pressure plate 201. In this position, the control tongue 235 and the non-return catch 236 have their ends at the root of a tooth of the ratchet wheel 220.

When the clutch is disengaged, the ends of the fingers of the diaphragm 203 are urged in the direction of the arrow F towards the base of the cover plate 202; in its displacement, the finger 250 progressively releases the control tongue 235, the end of which follows the inclined ramp defined by the tooth in the root of which it was engaged in the preceding step, the teeth 221 of the ratchet wheel 220 being so designed that, during this course of clutch disengagement with new liners, the end of the control tongue 235 does not jump a tooth, the non-return catch 236 retaining the ratchet wheel 220; this is achieved by the tongue 235 coming into abutment against the edge of the slots 274A in the wing portions 274 of the support piece 272.

As the liners become worn, the pressure plate 201, still subjected to the axial force imposed by the diaphragm 203, comes closer, in the known way, to the reaction plate, which is fixed axially as is the cover plate 202; the finger 250 of the diaphragm 203 is thus brought closer to the reaction plate and therefore to the open end of the cover plate 202, carrying the control tongue 235 in its movement; the ratchet wheel 220 rotates about its axis in the clockwise direction, this being the direction in which the non-return catch 236 does not perform its function but is able to jump from one tooth to another; this driving of the ratchet wheel 220 in rotation causes the worm 213 to rotate also on its axis; since the ramp means 211 are immobilised with respect to the cover plate 202 due to the force exerted by the diaphragm 203, the worm 213, which meshes with the teeth 218 of the ramp means 211, acts slightly on the teeth 218 so as to compress the helical spring 240, the direction of the thread of the worm 213 being determined accordingly.

During the declutching operation which follows the wear phase just described, the pressure plate 201 releases the liners by separating from them under the action of the tangential tongues 209, which displace, back towards the base of the cover plate 202, the pressure plate 201 and the ramp means 211, which are in contact with the diaphragm 203 through their engagement zones 214, and in contact with the pads 204 of the pressure plate 201 through their ramps 215. The helical spring 240 urges the worm 213 towards the wing portion 223 of the support piece 212, from which it is spaced in phases in which wear is taking place, that is to say from right to left with respect to FIGS. 41 and 42; since the load of the diaphragm 203 is no longer applied to the ramp means 211, the only force to be overcome in order to enable the ramp means 211 to rotate with respect to the pressure plate 201 is the return force exerted by the tangential tongues 209; if the load of the helical spring 240 is sufficiently high to overcome this force, then the spring 240 displaces the worm 213, which is prevented from turning on itself by the pressure from the non-return catch 236, and which will drive the teeth 218; by turning on themselves, the ramps 215 of the ramp means 211, by cooperation with the pads 204 of the pressure plate 201, will displace the pressure plate 201 from the base of the cover plate 202, thus increasing the axial distance between the working surface of the pressure plate 201 and the engagement zones 214 of the ramp means 211, and therefore at least partly taking up the clearance due to wear in the liners. Since the load of the helical spring 240 is a function of the amount by which it will have been compressed by the worm 213 during the wear phases, it can be seen that several operations of engaging and disengaging the clutch may be necessary before the device for taking up clearance enters into a wear-compensated phase proper, this being a function of the relative dimensioning of the components concerned; by way of example, the latter may be made in such a way that this wear-compensated phase proper occurs for the first time only after an amount of wear has taken place which corresponds to three tenths of a millimeter.

If wear has been sufficiently high for the ratchet wheel 220 to have rotated enough for the tongue 235 to jump a tooth on the return movement during the clutch engaging operation, the tongue 235, pushed by the finger 250, causes the ratchet wheel 220 to rotate, and the ramp means 211, no longer gripped by the diaphragm 203, turn so as to take up the wear; at the end of the wear take-up operation, the diaphragm, the ratchet wheel 220, the non-return catch 236 and the control tongue 235 regain the position which they occupied in FIG. 40.

Since the worm 213 and the ratchet wheel 220 are made as a single component, as can be seen, the support piece 212 equipped with this component, together with the resilient member 272, the spring 240 and the shaft 222, constitutes a sub-assembly which is ready to be installed on the cover plate 202.

In the version which has just been described, the spring 240 is wound around the shaft 222, being lodged within the axially compact single component that constitutes the ratchet wheel 220 and the worm 213; in the version shown in FIG. 45, the spring is on the outside of the said single component, being made in the form of an elastic stirrup 340 straddling the said single component.

It is possible to achieve this elastic function by supporting the said component elastically with respect to the cover plate; thus, as is shown in FIGS. 46 and 47, resilient leaves which are connected on one side to the axis about which the said single component is mounted for rotation, and on the other side to the cover plate 202, may be used for this purpose: in FIG. 46, the leaves 440 are straight and are connected to the cover plate through a bent-back lug of the latter; in FIG. 47, it is the leaves 540 that have a lug, which is bent back for connection to the cover plate.

As is shown in FIGS. 41, 42, 46 and 47, the shaft 222 is inclined with respect to a plane at right angles to the axis of the clutch, by an angle equal to that of the thread of the worm 213; as a result of this arrangement, the teeth in the set 218 are straight teeth, which facilitates manufacture of the ramp means 214.

As has been described earlier herein, during the clutch disengagement operation which follows a phase of wear, the pressure plate 201 releases the liners by moving away from them under the action of the tangential tongues 209, which return the pressure plate 201 and the ramp means 211 towards the base of the cover plate 202; in order to be certain that the helical spring 240 is able to actuate the ramp means 211 without any hindrance due to the axial return force exerted by the tangential tongues 209, it can be of advantage to limit the course of travel of the pressure plate 201 during declutching operations.

The modified version shown in FIG. 48 shows an arrangement which permits this; in this version, the pressure plate 201 carries an axial pin 301, which may for example be an extension of a rivet fastening the tongues 209 to the plate 201; the pin 301 carries two collars 302, 303 which define axial abutments.

A sleeve 305 surrounds the pin 301, and its axial length is smaller than the distance by which the two collars 302 and 303 are separated axially, the difference between the said lengths defining an axial clearance.

The sleeve 305 is fitted in a hole at the edge of the cover plate 202, to which it is fixed by friction, the axial abutments 302 and 303 being disposed on either side of the said edge; the said axial clearance thus defines the course of return travel of the plate 201 caused by the tongues 209; this axial clearance is constant regardless of the amount of wear in the liners; in this connection, in the event of wear in the latter, the sleeve 305 is displaced by the diaphragm force which is greater than the friction force between the sleeve 305 and the cover plate 202, which force is higher than the axial force due to the tongues 209.

In all of the foregoing, the non-return means consist of a catch which cooperates with the ratchet wheel; in another version, they consist of friction means, such as friction pads for example.

A single wear compensating device is preferably provided.

As will have been understood in the light of the description and drawings, the wear compensating device has a low sensitivity to vibrations, and particularly to those due to axial vibrations of the crankshaft of the engine of the vehicle, due to the action of the worm on a set of teeth fixed to the ramp means.

The wear compensating device has low sensitivity to centrifugal forces and thermal deformation.

Its sensitivity to corrosion is reduced.

In this connection, the irreversibility of the action of the worm on a set of teeth fixed to the ramp means, coupled to the non-return means, prevent accidental operation of the wear compensating device having regard to vibrations, and also when no wear has taken place. Thus, the pressure plate is not able to drive the worm through the ramp means.

The presence of the support piece carried by the cover plate and carrying the control member and the non-return means, in combination with the centring of the ramp means by the pressure plate, enables the wear compensating device to be highly resistant to the effects of centrifugal force.

The assembly consisting of the ratchet wheel, the worm and the helical spring takes up little space, and does not hinder ventilation of the clutch. This ventilation is encouraged by the presence of the apertures in the ramp means, and also by the presence of the pads.

The action of the axially acting resilient means on the control member cooperating with the ratchet means enables the wear compensating device to be disengaged.

The axially acting resilient means may take some other form, for example as described in Applications FR 97 11058 of Sep. 5, 1997, FR 97 04213 and FR 97 04214 of Apr. 7, 1997.

Thus, with reference to FIGS. 4, 5 and 3, 4 respectively of the documents FR 97 11058 and FR 97 04214, it is seen that a Belleville ring is mounted in series with the diaphragm so as to constitute the axially acting resilient declutching means for the clutch, the diaphragm being in contact with the control tongue directly or indirectly through interposed force transmitting means which act between the Belleville ring and the diaphragm.

The Belleville ring is an assistance ring of the positive type.

This assistance ring is for example dimensioned as a function of the progressive engagement means mounted within the friction disc.

The assistance ring can of course be mounted in parallel with the diaphragm, for example by acting between the cover plate and the inner end of the fingers of the diaphragm, as is described in the document FR-A-2 728 638.

What is claimed is:

1. A friction clutch, comprising a reaction plate adapted to be mounted in rotation on a driving shaft, a friction disc carrying friction liners at its outer periphery and adapted to be mounted in rotation on a driven shaft, a pressure plate (1, 51, 201), a cover plate (2, 52, 202) fixed on the reaction plate, axially acting resilient means (3, 53, 203) acting between, firstly, the cover plate (2, 52, 202), and secondly, the pressure plate (1, 51, 201) through abutment means (14, 214), the pressure plate (1, 51, 201) being fixed in rotation to the cover plate (2, 52, 202) while being able to be displaced axially with respect thereto and being subjected to the action of resilient return means (9, 209) for returning the pressure plate (1, 51, 201) axially towards the cover plate (2, 52, 202), the said clutch further including a wear compensating device comprising circumferentially disposed ramp means (11, 54, 211) located axially between the abutment means (14, 214) and the pressure plate (1, 51, 201) and adapted to be driven in rotation by means of a set of teeth (18, 59, 218), which they carry at their periphery and with which a tangentially disposed worm (13, 63, 213) cooperates, means (20, 60, 220) for driving the worm (13, 63, 213) in rotation being provided and being rendered operational by wear in the friction liners when the clutch is engaged, together with non-return means (36, 78, 98, 236) preventing the worm (13, 63, 213) from turning in the direction counter to that in which it is driven in rotation by the means (20, 60, 220) for driving it in rotation when they are operational, the worm (13, 63, 213), the non-return means (36, 78, 98, 236) and the means (20, 60, 220) for driving the worm (13, 63, 213) in rotation being carried by a support (12, 62, 92, 212) fixed to the cover plate (2, 52, 202), and the axially acting resilient means (3, 53, 203) consisting of a diaphragm, characterised by the fact that the means (20, 60, 220) for driving the worm (13, 63, 213) in rotation are controlled by the diaphragm (3, 53, 203).

2. A friction clutch according to claim 1, characterised by the fact that the means (20, 60, 220) for driving the worm (13, 63, 213) in rotation are controlled by the diaphragm (3, 53, 203) through an interposed control member (35, 76, 101, 121, 235), the course of travel of which is limited during operation of the clutch by a so-called control abutment (27–28, 71, 117, 274A).

3. A friction clutch according to claim 2, characterised by the fact that the ramp means (11, 54, 211) consist of an annular ring having ramps (15, 56, 215) which are inclined and spaced apart circumferentially, and by the fact that the ramp means (11) have an axial flange (16) formed with ventilating apertures (16A).

4. A friction clutch according to claim 3, characterised by the fact that the pressure plate (1, 51, 201) has pads (4, 57, 204) adapted to cooperate with the ramps (15, 56, 215) of the ramp means (11, 54, 211), and by the fact that the said annular ring further includes engagement zones (14, 214) consisting of the rounded upper edge of press-formed projecting elements disposed on circular arcs centred on the axis of the clutch and located radially outwardly of the ramps (15, 56, 215).

5. A friction clutch according to claim 2, characterised by the fact that the worm (13, 63, 213) is mounted for sliding movement along its axis, being subjected to the action of a resilient so-called take-up means (40, 86, 240, 340, 440, 540), and when it is displaced along its axis, it drives the said ramp means (11, 54, 211) in circumferential rotation, and by the fact that the resilient take-up means (40; 86, 240) is a helical spring surrounding a shaft (22, 67, 222) which carries the worm (13, 63, 213).

6. A friction clutch according to claim 5, characterised by the fact that the load exerted by the resilient take-up means (40, 86, 240, 340, 440, 540) increases with wear in the friction liners, and the said axial displacement is obtained by action of the resilient take-up means (40, 86, 240, 340, 440, 540) when its load is high enough to overcome the friction force due to the axial force from the resilient return means (9, 209) to which the ramp means (11, 54, 211) are subjected, the clutch being disengaged.

7. A friction clutch according to claim 5, characterised by the fact that the course of travel of the pressure plate (201) is limited in the declutching direction so as to release the ramp means (211) from the axial force arising from the resilient return means (209).

8. A friction clutch according to claim 5, characterised by the fact that the means (20, 60, 220) for driving the worm (13, 63, 213) in rotation consist of a ratchet wheel which is fixed to the worm (13, 63, 213) for rotation with the latter.

9. A friction clutch according to claim 8, characterised by the fact that the shaft (22, 67, 222) carrying the worm (13, 63, 213) and the helical spring (40, 86, 240) is supported by the support (12, 62, 92, 212).

10. A friction clutch according to claim 9, characterised by the fact that the clutch is of the push-to-release type and by the fact that the support (12) is U-shaped, having a spine portion (19) and two wing portions (23, 24) adapted to support the shaft (22), and the wing portions (23, 24) of the support piece (12) are extended by L-shaped arms (27, 28) which extend towards each other at right angles to the spine portion (19), and each of which terminates in a C-shaped end seamed on the edge of a transverse aperture (6) of the cover plate (2) formed in a radial projecting element (5) that defines a housing for the device for taking up clearance.

11. A friction clutch according to claim 10, characterised by the fact that the control member is a control tongue (35), while the non-return means consist of a catch (36) which cooperates with the ratchet wheel (20), by the fact that the support (12) is adapted to receive a resilient member (31) in the general form of a crook, each end of which is provided with an inwardly directed return portion, and the portion (32) of the crook having the greater length increases in width towards its end, to terminate in a return portion (34), the end of which carries a control tongue (35), the portion of the crook having the shorter length (33) having a return portion (36) that constitutes a non-return catch which extends generally parallel to the control tongue (35) and which is spaced away from the latter, in such a way that, when the resilient member (31) and the ratchet wheel (20) are mounted in the support piece (12), the non-return catch (36) and the control tongue (35) each cooperate with the root of a tooth.

12. A friction clutch according to claim 11, characterised by the fact that, for mounting it in the support piece (12), the resilient member (31) carries lateral stirrup arms (37, 38) disposed on either side of the resilient crook-shaped portion and extending orthogonally with respect to the latter, and the free ends of the stirrup arms (37, 38) carry holes (39) for the shaft (22).

13. A friction clutch according to claim 11, characterised by the fact that the support piece (12), equipped with the worm (13), the ratchet wheel (20), the resilient member (31), the spring (40) and the shaft (22), constitutes a sub-assembly ready to be installed in the cover plate (2).

14. A friction clutch according to claim 9, characterised by the fact that the diaphragm (3) carries at its periphery a radial finger referred to as an actuator (45), which extends radially outwardly from the Belleville ring portion of the diaphragm (3).

15. A friction clutch according to claim 12, characterised by the fact that the portion of the crook of the resilient member (31) having the greater length comes into abutment against the arms (27, 28) of the to support piece (12).

16. A friction clutch according to claim 14, characterised by the fact that the support piece (62) is U-shaped, having a spine portion (64) and two wing portions (65, 66), each carrying a hole (61) adapted to receive the shaft (67) of the device, the spine portion (64) carrying a lateral stirrup lug (68) directed outwardly and adapted to be fixed on the external flange of the cover plate (52), and the wing portions (65, 66) of the support piece (62) having, on the opposite side from that on which the lug (68) is situated, an axial extension, the end of which is bent outwardly so as to constitute a fastening lug (69) parallel with the said lug (68) and adapted to be fixed to the base of the cover plate (52).

17. A friction clutch according to claim 16, characterised by the fact that the control member is a control tongue (76) and by the fact that the resilient member (72) is in the form of a saddle and comprises a flat elongate body (73) carried at each of its ends an arm (74) having a hole (75) adapted to receive the shaft (67), and, on one of its longitudinal edges, the body (73) is extended to define an oblique extension (84) on the same side as that on which the arms (74) are located, with slots (82, 83) formed in the body (73) limiting the extension (84) with respect to the ends of the body (73) carrying the arms (74), the free end of the extension (84) being provided with a return element (85) which is extended by a control tongue (76) extending towards the body (73) and generally parallel to the latter.

18. A friction clutch according to claim 16, characterised by the fact that the resilient member comprises two distinct members, a first member, for the non-return function, being a U-shaped stirrup member (93), the two wing portions (94) of which carry holes (95) for supporting the shaft (67), the spine portion (96) of the said stirrup member (93) being, on one of its sides and in the vicinity of its middle part, divided into at least two strips (98A–D), which extend in a direction parallel to that of the wing portions (94) and are extended by return portions at right angles, which extend on the same side as the wing portions (94) with respect to the spine portion (96), generally at right angles to the said spine portion (96), the said return portions are of slightly different lengths, and the strips (98A–D) constitute a non-return catch (98) which is adapted to cooperate with the ratchet wheel (60).

19. A friction clutch according to claim 18, characterised by the fact that the second member for the control function of the ratchet wheel (63) is a wire spring (107) associated with a finger (101) carried by a cylindrical sleeve (102) force-fitted on a shaft (103), the sleeve (102) and its finger (101) being fixed to the shaft (103), for rotation with the latter, by a cotter pin (105) which passes diametrically through the sleeve (102) and the shaft (103), and which projects from one side of the sleeve (102) so as to constitute an end stop for the base portion (108) of an open loop (106) of the wire spring (107), which is configured in the manner of a coathook, the said wire spring (107) being adapted to subject the control finger (101) to a torque which applies the end of the finger (101) on the ratchet wheel (63).

20. A friction clutch according to claim 8, characterised by the fact that the teeth (221) of the ratchet wheel (220) are formed at the outer periphery of the thread of the worm (213).

21. A friction clutch according to claim 20, characterised by the fact that the clutch is of the pull-to-release type, and by the fact that the support piece (212) is generally L-shaped, having two wing portions (223, 224), one of which (223) is adapted to support the shaft (222), the other one (224) being adapted for fastening the support piece (212) on the cover plate (202), the wing portion (223) that supports the shaft extending through the diaphragm (203) between two of its fingers.

22. A friction clutch according to claim 21, characterised by the fact that the control member is a control tongue (235) and by the fact that the resilient member (272) has the general form of a saddle and comprises a flat body (273) carrying at each of its ends an arm (274) having a hole (275) adapted to receive the shaft (222), the two arms (274) being parallel and extending on the same side and generally at right angles with respect to the body (273), and, on one of its longitudinal edges, the body (273) is extended in an extension (284) which has a first portion (284A) that extends the body (273) lengthwise, a second portion (284B) directed in the opposite direction from the arms (274) and making an acute angle with the body (273), a third portion (284C) defining a U with the second portion (284B) and extending parallel to the latter, and a fourth portion (284D) directed towards the body (273) and being parallel to the latter, at a slightly higher level such that it extends between the arms (274), the said fourth portion (284D) constituting a control tongue (235) directly or otherwise.

23. A friction clutch according to claim 22, characterised by the fact that, on its longitudinal edge opposite to that on which the extension (284) is situated, the body (273) carries a non-return catch (236) consisting of at least two flat fingers (236A, 236B) of different lengths.

24. A friction clutch according to claim 1, characterised by the fact that the resilient take-up means is on the outside of the worm (213), and is made in the form of an elastic stirrup (340) straddling the said worm (213).

25. A friction clutch according to claim 1, characterised by the fact that the shaft (222) is inclined with respect to a plane at right angles to the axis of the clutch, by an angle equal to that of the thread of the worm (212).

* * * * *